US010517061B1

(12) United States Patent
Kumar et al.

(10) Patent No.: US 10,517,061 B1
(45) Date of Patent: Dec. 24, 2019

(54) ENHANCED CELL IDENTIFICATION LOCATION DETERMINATION

(71) Applicant: QUALCOMM Incorporated, San Diego, CA (US)

(72) Inventors: Akash Kumar, Hyderabad (IN); Stephen William Edge, Escondido, CA (US); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/155,962

(22) Filed: Oct. 10, 2018

(51) Int. Cl.
*H04W 64/00* (2009.01)
*H04W 24/08* (2009.01)
*H04W 24/10* (2009.01)

(52) U.S. Cl.
CPC ........... *H04W 64/00* (2013.01); *H04W 24/08* (2013.01); *H04W 24/10* (2013.01)

(58) Field of Classification Search
CPC .............................. H04W 64/00; H04W 24/10
See application file for complete search history.

(56) References Cited

U.S. PATENT DOCUMENTS

| | | | |
|---|---|---|---|
| 2010/0227612 A1 | 9/2010 | Wang et al. | |
| 2013/0235742 A1* | 9/2013 | Josiam | H04W 24/10 370/252 |
| 2014/0062784 A1 | 3/2014 | Rison | |
| 2014/0218236 A1 | 8/2014 | Sadeghi et al. | |
| 2016/0360452 A1 | 12/2016 | Koorapaty et al. | |
| 2018/0138962 A1* | 5/2018 | Islam | H04L 5/0048 |

OTHER PUBLICATIONS

Zhang P., et al., "Cooperative localization in 5G networks: A survey", ICT Express, Mar. 2017, vol. 3, No. 1, pp. 27-32.

* cited by examiner

*Primary Examiner* — Diane D Mizrahi
(74) *Attorney, Agent, or Firm* — Hunter Clark PLLC

(57) ABSTRACT

Techniques for improving enhanced cell identification (E-CID) positioning are provided. An example of a method for determining a location of a mobile device according to the disclosure includes generating a plurality of receive beams with a mobile device, receiving, with one or more of the plurality of receive beams, a radio beam transmitted from a base station, such that the radio beam includes a beam identification value, and determining a measurement quantity for the radio beam for each of the one or more of the plurality of receive beams.

14 Claims, 13 Drawing Sheets

ENHANCED CELL IDENTIFICATION
LOCATION DETERMINATION

CROSS-REFERENCE TO RELATED
APPLICATIONS

This application claims the right of priority under 35 U.S.C. 119(a) to foreign application no. 2018/41036951 filed in the Indian Patent Office on Sep. 29, 2018, entitled "Enhanced Cell Identification Location Determination," the entire contents of which is hereby incorporated herein by reference for all purposes.

BACKGROUND

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine times of arrival, time differences of arrival and/or receive time-transmit time differences. Combining these measurements with known locations for the base stations and known transmission times from each base station may enable location of the mobile device using such position methods as Observed Time Difference Of Arrival (OTDOA) or Enhanced Cell ID (E-CID).

In general, E-CID is a relatively low complexity and popular positioning protocol for Long Term Evolution (LTE) cellular networks. In an E-CID positioning protocol, a mobile device may share a cell ID of a serving cell to a location server (LS) along with additional parameters configured to enable the LS to estimate a position of the mobile device based on a 2D circular region of the cell coverage associated with the cell ID.

SUMMARY

An example of a method for determining a location of a mobile device according to the disclosure includes generating a plurality of receive beams with the mobile device, receiving, with one or more of the plurality of receive beams, a radio beam transmitted from a base station, such that the radio beam includes a beam identification value, and determining a measurement quantity for the radio beam for each of the one or more of the plurality of receive beams.

Implementations of such a method may include one or more of the following features. The location of the mobile device may be based at least in part on the beam identification value and the measurement quantity for the radio beam for each of the one or more of the receive beams. Determining the location may include providing the beam identification value and the measurement quantity for the radio beam for each of the one or more of the receive beams to a location server and receiving the location from the location server. A beam width may be determined for at least one of the one or more of the plurality of receive beams, and determining the location may be based at least in part on the beam width. Determining the beam width may include determining a first measurement quantity for a first receive beam and a second measurement quantity for a second receive beam, such that the second measurement quantity is 50% of the first measurement quantity and the beam width is equal to a width of the second receive beam. Determining the beam width may include determining a first measurement quantity for a first receive beam and a second measurement quantity for a second receive beam, such that the second measurement quantity is 50% of the first measurement quantity and the beam width is based on an angle between the first receive beam and the second receive beam. The measurement quantity may be a reference signal received power value and/or a reference signal received quality value. The measurement quantity may be a mean angle of at least one of the one or more of the receive beams relative to an orientation of the mobile device or relative to a coordinate system.

An example of a mobile device according to the disclosure includes one or more modems and antenna modules configured to generate a plurality of receive beams with the mobile device, receive, with one or more of the plurality of receive beams, a radio beam transmitted from a base station, wherein the radio beam includes a beam identification value, and at least one processor configured to determine a measurement quantity for the radio beam for each of the one or more of the plurality of receive beams.

Implementations of such a mobile device may include one or more of the following features. The at least one processor may be configured to determine a location based at least in part on the beam identification value and the measurement quantity for the radio beam for each of the one or more of the plurality of receive beams. The at least one processor may be configured to determine the location by providing the beam identification value and the measurement quantity for the radio beam for each of the one or more of the plurality of receive beams to a location server and to receive the location from the location server. The at least one processor may be configured to determine a beam width of at least one of the one or more of the plurality of receive beams, and determine the location based at least in part on the beam width. The at least one processor may be configured to determine the beam width by determining a first measurement quantity for a first receive beam and a second measurement quantity for a second receive beam, such that the second measurement quantity is 50% of the first measurement quantity and the beam width is equal to a width of the second receive beam. The at least one processor may be configured to determine the beam width by determining a first measurement quantity for a first receive beam and a second measurement quantity for a second receive beam, such that the second measurement quantity is 50% of the first measurement quantity and the beam width is based on an angle between the first receive beam and the second receive beam. The measurement quantity may be a reference signal received power value or a reference signal received quality value. The measurement quantity may be a mean angle of at least one of the one or more of the plurality of receive beam relative to an orientation of the mobile device or relative to a coordinate system.

An example of a method for determining a location of a mobile device according to the disclosure includes receiving a measurement result measured by the mobile device, the measurement result including at least a beam identification value and a received power value associated with a directional synchronization signal block received by one or more receive beams generated by the mobile device, and determining the location of the mobile device based at least in part on the measurement result.

Implementations of such a method may include one or more of the following features. The measurement result may include a receive beam width value based on the one or more receive beams and determining the location of the mobile device may be based at least in part on the receive beam width value. The measurement result may include a reference signal received power value and determining the location of the mobile device may be based at least in part on the reference signal received power value. The measurement result may include a reference signal received quality value and determining the location of the mobile device is based at least in part on the reference signal received quality value. The measurement result may include a mean angle of a receive beam relative to a coordinate system and determining the location of the mobile device is based at least in part on the mean angle of the receive beam. An enhanced cell identification measurement initiation request message may be provided to the mobile device, such that the enhanced cell identification measurement initiation request message includes a measurement quantities information element enumerating a beam ID value, a mean angle per receive beam value, a reference signal received power per beam ID value, and a beam width per beam ID value. Receiving the measurement result from the mobile device may include receiving an enhanced cell identification measurement result message from the mobile device, such that the enhanced cell identification measurement result message includes a result beam information element based on the one or more receive beams, the result beam information element may enumerate a beam ID value, a mean angle of the receive beam value, a reference signal received power per beam value, and a receiver beam width value.

An example of a system for determining a location of a mobile device according to the disclosure includes at least one communication module configured to receive a measurement result measured by the mobile device, the measurement result including at least a beam identification value and a received power value associated with a directional synchronization signal block received by one or more receive beams generated by the mobile device, and at least one processor configured to determine the location of the mobile device based at least in part on the measurement result.

Implementations of such a system may include one or more of the following features. The measurement result may include a receive beam width value based on the one or more receive beams and the at least one processor may be configured to determine the location of the mobile device is based at least in part on the receive beam width value. The measurement result may include a reference signal received power value and the at least one processor may be configured to determine the location of the mobile device is based at least in part on the reference signal received power value. The measurement result may include a reference signal received quality value and the at least one processor may be configured to determine the location of the mobile device is based at least in part on the reference signal received quality value. The measurement result may include a mean angle of a receive beam relative to a coordinate system and the at least one processor may be configured to determine the location of the mobile device is based at least in part on the mean angle of the receive beam. The at least one processor may be configured to provide an enhanced cell identification measurement initiation request message to the mobile device, such that the enhanced cell identification measurement initiation request message includes a measurement quantities information element enumerating a beam ID value, a mean angle per receive beam value, a reference signal received power per beam ID value, and a beam width per beam ID value. Receiving the measurement result from the mobile device may include receiving an enhanced cell identification measurement result message from the mobile device, such that the enhanced cell identification measurement result message includes a result beam information element based on the one or more receive beams, the result beam information element may enumerate a beam ID value, a mean angle of the receive beam value, a reference signal received power per beam value, and a receiver beam width value.

Items and/or techniques described herein may provide one or more of the following capabilities, as well as other capabilities not mentioned. A base station may transmit periodic synchronization signals. The synchronization signals may be directional beams. Each synchronization signal may include a beam identification value. A mobile device may generate directional receive beams configured to receive the synchronization signals. The receive beams may be directional relative to the orientation of the mobile device. The orientation of the mobile device may be determined based on a coordinate system (e.g., true north, magnetic north, etc.) and the receive beams may be directional to the coordinate system. The beam width of the receive beams may be varied. One or more measurement quantities may be determined for each receive beam. The measurement quantities are associated with a beam identification value. The measurement quantities may be a mean angle of a receive beam (relative to the orientation of the mobile device), a reference signal received power (RSRP) value, a reference signal received quality (RSRQ) value, and a receive beam width value. The UE may determine a current location based on the measurement quantities. The measurement quantities may be provided to a network node. Synchronization beams from other base stations may also be received and used to determine the current location of the mobile device. Further, it may be possible for an effect noted above to be achieved by means other than that noted, and a noted item/technique may not necessarily yield the noted effect.

DETAILED DESCRIPTION

Figure 1:
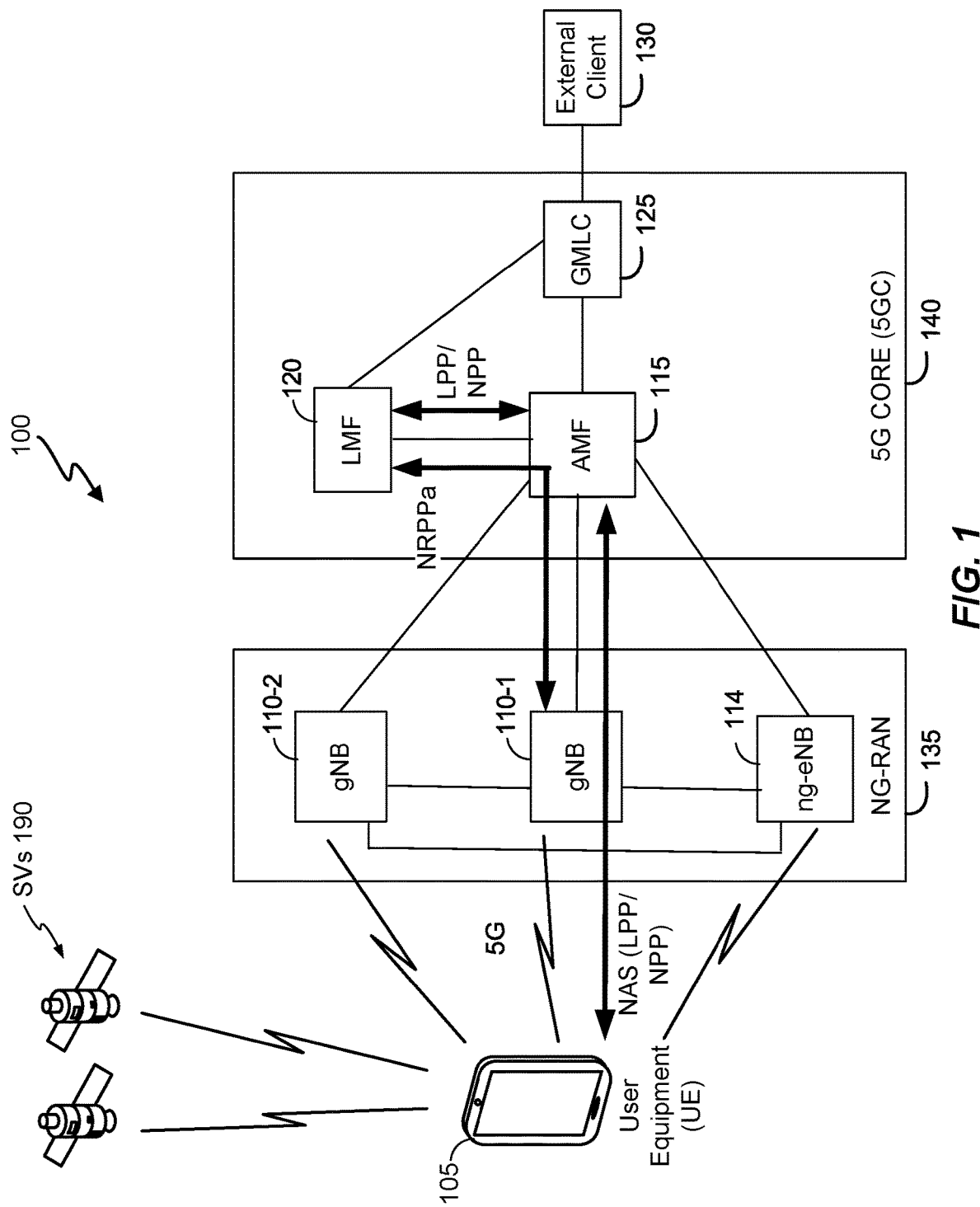
FIG. 1 is a diagram of an example communication system.

Obtaining the location or position of a mobile device that is accessing a wireless network may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine signal strengths, times of arrival, time differences of arrival and/or receive time-transmit time differences. Combining these measurements with known locations for the base stations and possibly known transmission times from each base station may enable location of the mobile device using such position methods as Observed Time Difference Of Arrival (OTDOA) or Enhanced Cell ID (E-CID). Such terrestrial based position methods may be employed in wireless networks that support different wireless technologies such as Long Term Evolution (LTE) and Fifth Generation (5G) (also referred to New Radio (NR)) as defined by an organization known as the Third Generation Partnership Project (3GPP).

The accuracy of E-CID Positioning in prior LTE networks is generally limited because the position uncertainty can only be reduced to a 2D circular region with a finite radius. This impact of this limitation may be reduced in modern wireless networks. In 5G NR networks, for example, a base station such as a gNB may utilize millimeter-wave frequencies (mm wave) above 24 GHz to transmit and receive to/from mobile devices. The 5G NR physical layer relies on beam forming technologies to establish efficient and reliable communication between stations. The transmitted directional beams may be encoded with unique beam identification information configured to allow a receiving station to distinguish between the various beams transmitted by one or more base stations in a network. In an example, the beam ID value may be encapsulated within the Synchronization Signal Burst Index (i.e., a SSB Index value). A mobile device may be configured to receive the transmitted beams by forming a corresponding directional receive beam aimed in the general direction of the transmitter.

To improve the accuracy of E-CID positioning, a mobile device receiver may be configured to utilize received cell identification information and the received beam ID information (e.g., the SSB index value). The addition of the beam ID information may be used to reduce the position uncertainty to a specific sector of a cell by mapping the beam ID to a spatial mean angle. The E-CID position estimate may be further improved by estimating the position of the mobile device within the specific beam using additional measurement quantities such as a receiver beam width value and signal strength related parameters (e.g., Reference Signal Received Power (RSRP) and Reference Signal Received Quality (RSRQ) values) per beam ID measured. The additional measurement quantities may be utilized by the mobile device to determine a current location (e.g., local computation), and/or the measurement quantities may be provided to a network node to determine the current location of mobile device (e.g., remote computation/network assisted). In either the local or remote computation use cases, additional information elements (IEs) may be included in 5G NR communication protocols to request and disseminate the measurement quantities.

Referring to FIG. 1, a diagram of a communication system 100, according to an embodiment is shown. The communication system 100 may be configured to implement E-CID positioning. Here, the communication system 100 comprises a mobile device (i.e., user equipment (UE)) 105, and components of a Fifth Generation (5G) network comprising a Next Generation (NG) Radio Access Network (RAN) (NG-RAN) 135 and a 5G Core Network (5GC) 140. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from satellite vehicles (SVs) 190 for a Global Navigation Satellite System (GNSS) like Global Positioning System (GPS), GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It is noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology or for other communication technologies and protocols) may be used to transmit (or broadcast) directional synchronization signals (e.g. gNBs 110, ng-eNBs 114), receive and measure directional signals at UEs (e.g. UE 105) and provide location assistance to UE 105 (via a GMLC 125 or other location server) and/or compute a location for a UE 105 at a location-capable device such as the UE 105, a gNB 110 or LMF 120 based on measurements quantities received at the UE 105 for such directionally transmitted signals. It is understood that the gateway mobile location center (GMLC 125), location management function (LMF 120), access and mobility management function (AMF 115), and the ng-eNB (eNodeB) and gNB (gNodeB) are exemplary and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GC 140 not shown in FIG. 1, or possibly via a Gateway Mobile Location Center (GMLC) 125) and/or allow the external client 130 to receive location information regarding the UE 105 (e.g., via the GMLC 125).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 135 shown in FIG. 1 include NR Node Bs, also referred to as gNBs, 110-1 and 110-2 (collectively and generically referred to herein as gNBs 110). Pairs of gNBs 110 in NG-RAN 135 may be connected to one another—e.g. directly as shown in FIG. 1 or indirectly via other gNBs 110. Access to the 5G network is provided to UE 105 via wireless communication between the UE 105 and one or more of the gNBs 110, which may provide wireless communications access to the 5GC on behalf of the UE 105 using 5G. In FIG. 1, the serving gNB for UE 105 is assumed to be gNB 110-1, although other gNBs (e.g. gNB 110-2) may act as a serving gNB if UE 105 moves to another location or may act as a secondary gNB to provide additional throughout and bandwidth to UE 105.

Base stations (BSs) in the NG-RAN 135 shown in FIG. 1 may also include a next generation evolved Node B, also referred to as an ng-eNB, 114. Ng-eNB 114 may be connected to one or more gNBs 110 in NG-RAN 135—e.g. directly as shown in FIG. 1 or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of UE 105 positioning using directional SS Burts may be applicable to such other networks—e.g. from an eNB and/or from a WiFi IEEE 802.11 access point (AP).

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g. by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by 5GC 140 in some implementations.

As further illustrated in FIG. 1, the LMF 120 may communicate with the gNBs 110 and/or ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and a serving gNB 110-1 or serving ng-eNB 114 for UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or E-CID. The NRPPa protocol may be used to support positioning of UE 105 using network based position methods such as E-CID (e.g. when used with measurements obtained by a gNB 110 or ng-eNB 114) and/or may be used by LMF 120 to obtain location related information from gNBs 110 and/or ng-eNBs 114, such as parameters defining directional SS transmissions from gNBs 110 and/or ng-eNB 114.

With a UE assisted position method, UE 105 may obtain location measurements and send the measurements to a location server (e.g. LMF 120) for computation of a location estimate for UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 110, ng-eNB 114 and/or a WLAN AP. The location measurements may also or instead include measurements of GNSS pseudorange, code phase and/or carrier phase for SVs 190. With a UE based position method, UE 105 may obtain location measurements (e.g. which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). With a network based position method, one or more base stations (e.g. gNBs 110 and/or ng-eNB 114) or APs may obtain location measurements (e.g. measurements of RSSI, RTT, RSRP, RSRQ or Time Of Arrival (TOA) for signals transmitted by UE 105) and/or may receive measurements obtained by UE 105, and may send the measurements to a location server (e.g. LMF 120) for computation of a location estimate for UE 105.

Information provided by the gNBs 110 and/or ng-eNB 114 to the LMF 120 using NRPPa may include timing and configuration information for directional SS transmissions and location coordinates. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things, depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g. beam ID, beam width, mean angle, RSRP, RSRQ measurements) of directional signals transmitted within particular cells supported by particular gNBs 110 and/or the ng-eNB 114 (or supported by some other type of base station such as an eNB or WiFi AP). The UE 105 may send the measurement quantities back to the LMF 120 in an LPP or NPP message (e.g. inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of a UE 105 using directional PRSs may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

As noted, in some embodiments, positioning functionality may be implemented, at least in part, using the directional SS beams, sent by base stations (such as the gNBs 110 and/or ng-eNB 114) that are within range of the UE whose position is to be determined (e.g., the UE 105 of FIG. 1). The UE may, in some instances, use the directional SS beams from a plurality of base stations (such as gNBs 110, ng-eNB 114, etc.) to compute the UE's position.

Figure 2A:
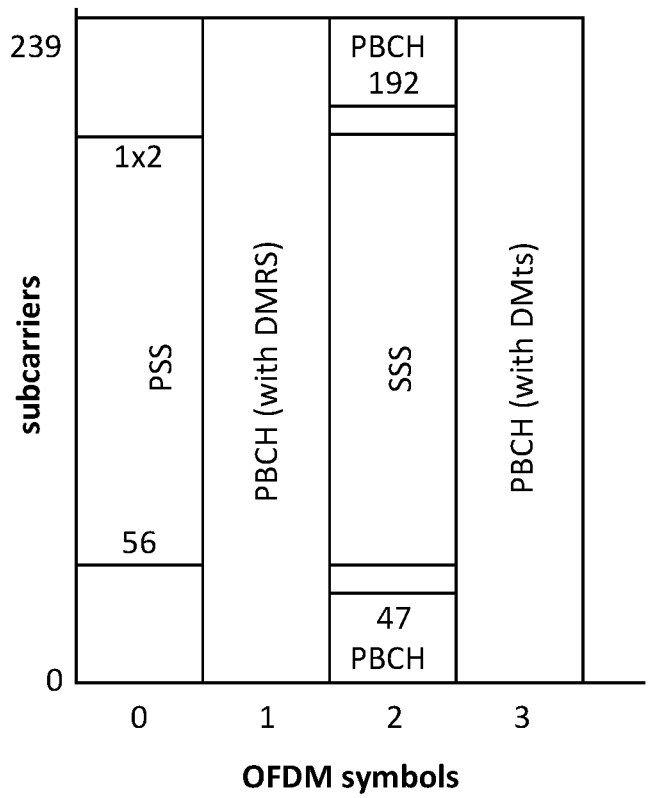
FIG. 2A is an example synchronization signal in a fifth-generation new radio (5G NR) wireless network.

Referring to FIG. 2A, an example synchronization signal in a 5G NR wireless network is shown. The Synchronization Signal and Physical Broadcast Channel (PBCH) block (SSB/SS Block) may include a primary and a secondary synchronization signals (PSS, SSS), each occupying 1 symbol and 127 subcarriers, and PBCH spanning across 3 OFDM symbols and 240 subcarriers. The periodicity of the SSB can be configured by the network and the time locations where SSB can be sent are determined by sub-carrier spacing. Within the frequency span of a carrier, multiple SSBs can be transmitted. The Physical Cell Identifiers (PCIs) of the SSBs do not have to be unique, i.e. different SSBs can have different PCIs.

In some versions of the 3GPP specifications (e.g., 3GPP "NR and NG-RAN Overall Description—Rel. 15," TS 38.300, 2018), the concept of SSB and burst emerged for periodic synchronization signal transmission from the gNBs. An SS block may be a group of 4 OFDM symbols in time and 240 subcarriers in frequency (i.e., 20 resource blocks), as shown in FIG. 2. The SS block may carry the PSS, the SSS and the PBCH. A Demodulation Reference Signal (DMRS) associated with the PBCH may be used to estimate the Reference Signal Received Power (RSRP) of the SS block. In a slot of 14 symbols, there are two possible locations for SS blocks: symbols 2-5 and symbols 8-11. The SS blocks may be grouped into the first 5 ms of an SS burst, which can have different periodicities TSS. For example, value of TSS may be on the order of 5, 10, 20, 40, 80, or 160 ms. When accessing the network for the first time, a UE may assume a periodicity TSS=20 ms. When considering frequencies for which beam operations are required, each SS block may be mapped to a certain angular direction. To reduce the impact of SS transmissions, SS may be sent through wide beams, while data transmission for the active UE may usually performed through narrow beams, to increase the gain produced by beamforming.

Figure 2B:
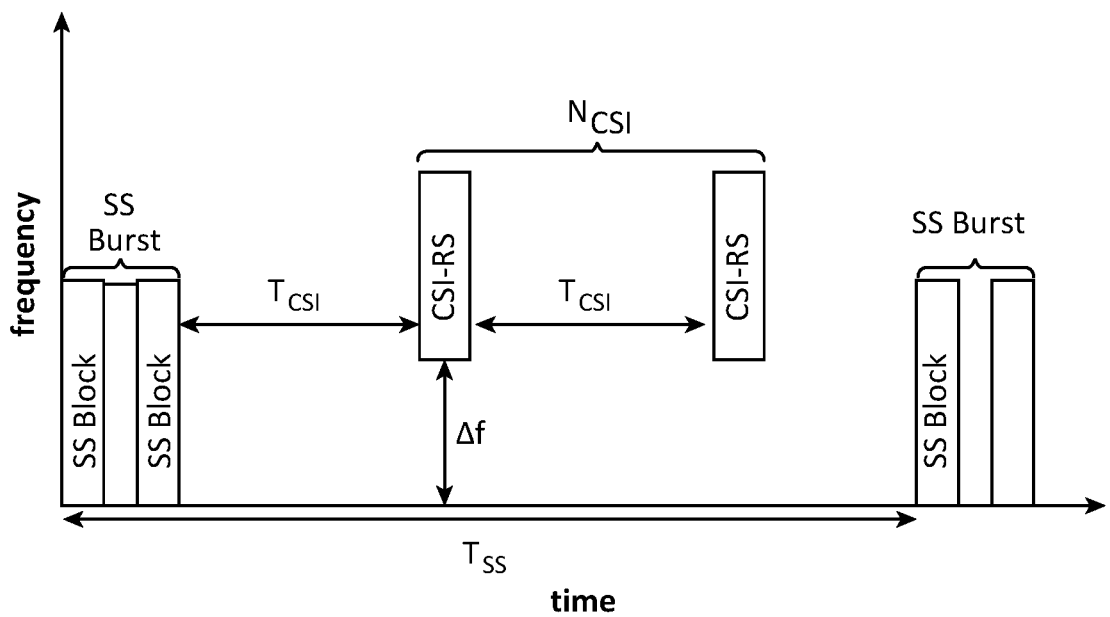
FIG. 2B is an example channel-state information reference signal (CSI-RS) periodicity configuration in a 5G NR wireless network.

In an embodiment, CSI-RSs may be used for Radio Resource Management (RRM) measurements for mobility management purposes in connected mode. For example, it may be possible to configure multiple CSI-RS to the same SS burst, in such a way that a UE may first obtain synchronization with a given cell using the SS bursts, and then use that as a reference to search for CSI-RS resources. The CSI-RS measurement window configuration may contain at least the periodicity and time/frequency offsets relative to the associated SS burst. Referring to FIG. 2B, an example CSI-RS periodicity configuration in a 5G NR wireless network is shown. SS blocks may be sent every TSS ms, and they embed time and frequency offsets indicating the time and frequency allocation of CSI-RS signals within the frame structure. As depicted, a CSI-RS signal may be sent $T_{CSI}$ ms after the end of an SS burst. In general, in a 5G NR network, the best directions for the beams of the transceiver need to be periodically identified (e.g., through beam search operations), in order to maintain the alignment between the communicating nodes. In an example, SS- and CSI-based measurement results can be jointly used to reflect the different coverage which can be achieved through different beamforming architectures.

Figure 3:
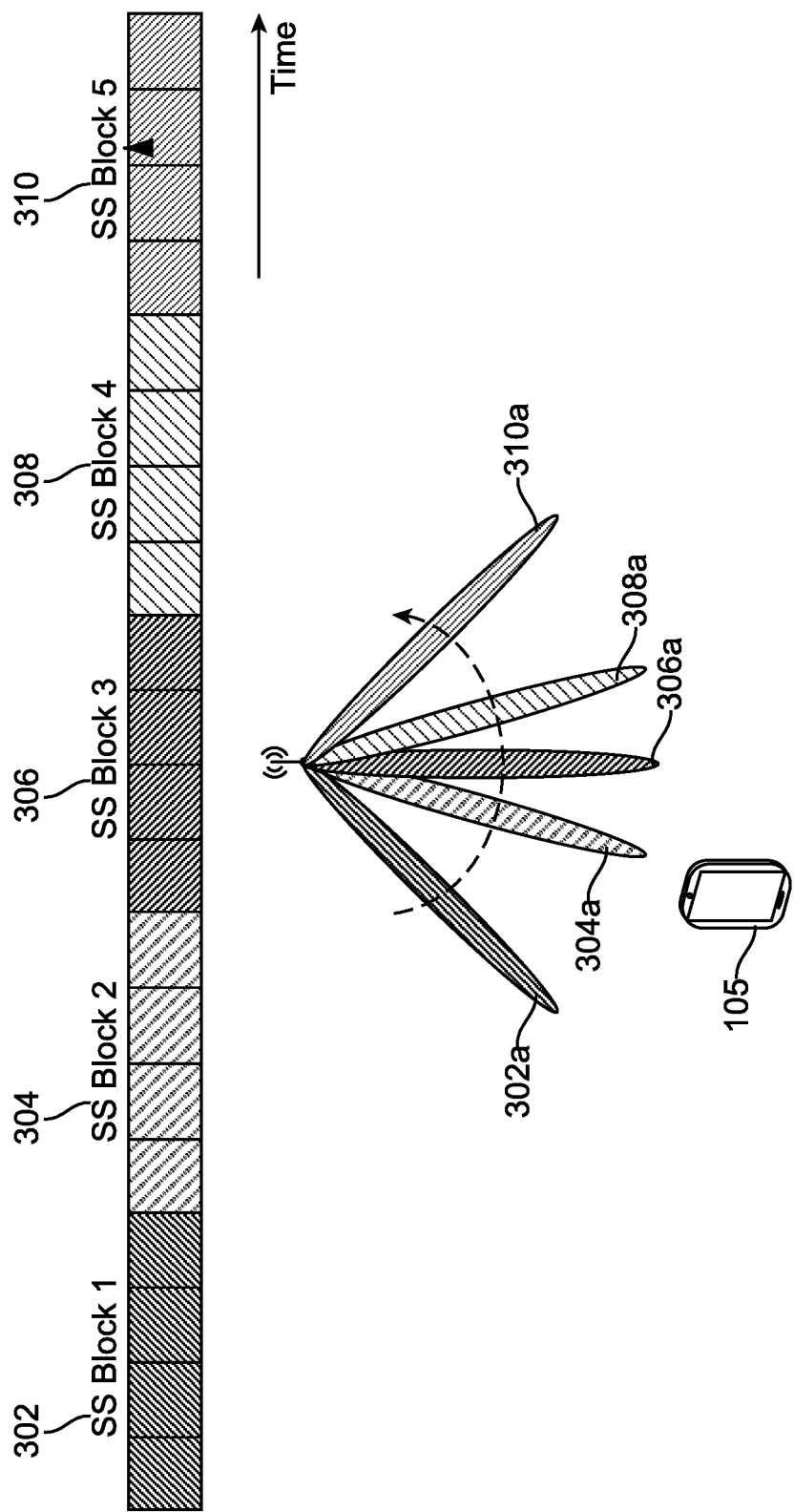
FIG. 3 is a conceptual diagram of directional beams transmitted from a base station based on a synchronization signal (SS) burst.

Referring to FIG. 3, a conceptual diagram directional beams transmitted from a base station based on a synchronization signal (SS) burst is shown. The SS Burst includes a plurality of SS blocks such as a first SS Block 302, a second SS Block 304, a third SS Block 306, a fourth SS block 308 and a fifth SS Block 310. An SS burst may include additional SS blocks. As discussed above, each SS block 302, 304, 306, 308, 310 may be mapped to an angular direction and a specific beam ID. For example, the first SS block 302 is mapped to a first beam 302a with a beam identification value (e.g., index) of 1, the second SS block 304 is mapped to a second beam 304a with a beam identification value of 2, the third SS block 306 is mapped to a third beam 306a with a beam identification value of 3, the fourth SS block 308 is mapped to a fourth beam 308a with a beam identification value of 4, and the fifth SS block 310 is mapped to a fifth beam 310a with a beam identification value of 5. During an initial signal acquisition procedure, a UE 105 may receive one or more beam identification values from base stations (e.g., gNB) in a wireless network. Once the UE 105 receives a beam from a particular base station, the UE may be configured to map the received beam identification value and a cell identification based on a codebook. For example, when the UE 105 receives the second beam 304a with the beam identification value of 2 (i.e., associated with SS Block 2), the UE may be configured to reference a codebook (e.g., a data structure) with the beam identification value to determine the angular information associated with the second beam 304a. In an example, the UE may report the beam identification back to a network node configured to determine the angular information based on a codebook (i.e., stored remote from the UE). In general, there may be a one-to-one mapping between a beam identification value (e.g., a SSB ID) with a spatial angle of the transmitted beam. One or more data structures such as a codebook (e.g., data table) located on a network node and/or the UE may be used to determine the angular direction of the transmitted beam based on the beam identification value.

Figure 4:
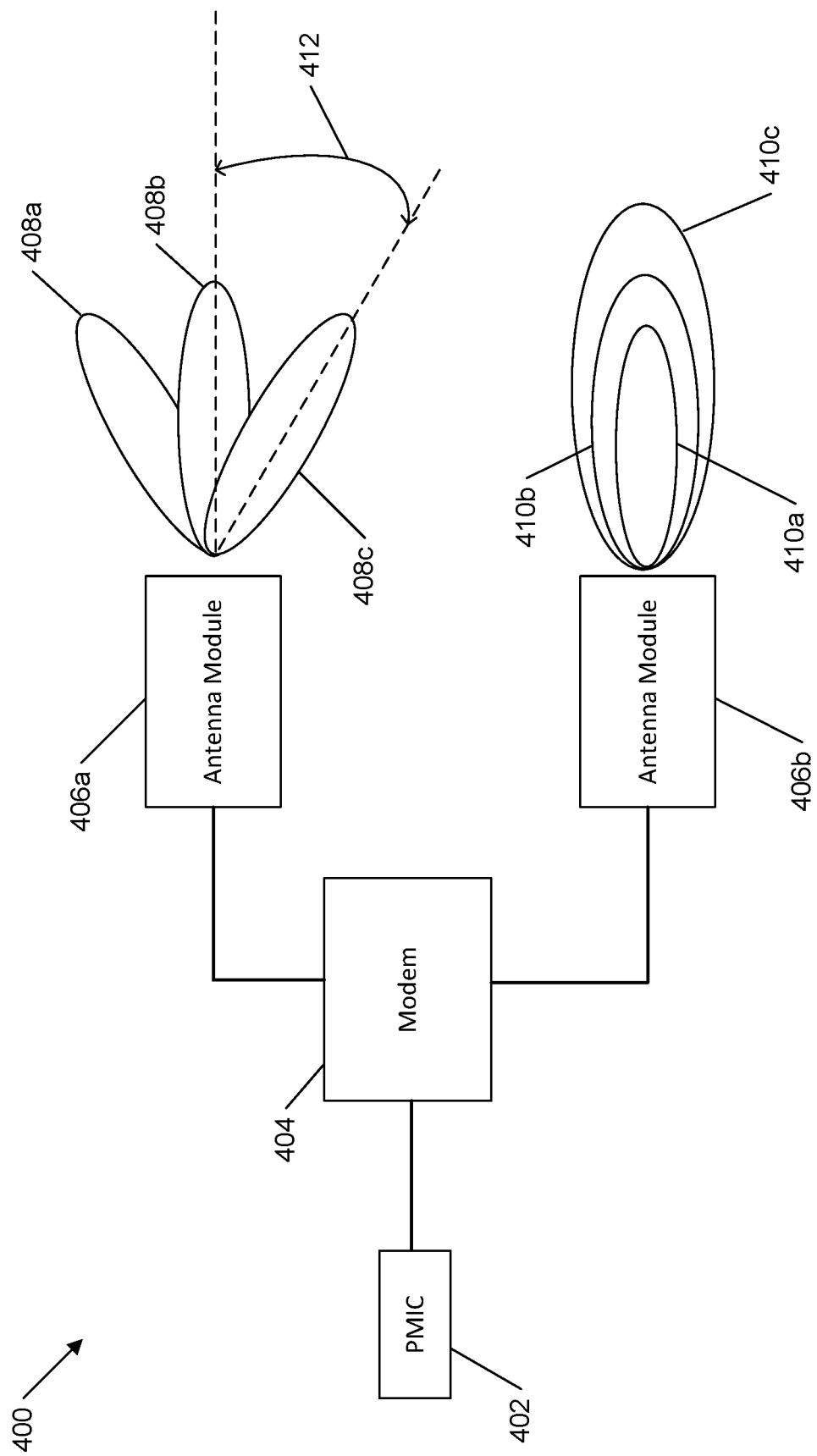
FIG. 4 is a block diagram of antenna modules in an example mobile device with configurable receive beam steering and receive beam width.

Referring to FIG. 4, a block diagram of antenna modules in an example mobile device 400 with configurable receive beam steering and receive beam width is shown. The diagram includes a Power Management integrated circuit (PMIC) 402, a modem 404, a first antenna module 406a, and a second antenna module 406b. The PMIC 402 is operably coupled to the modem 404 and is configured to control the power to the modem 404. The modem 404 may include one or more modems operably coupled to the antenna modules 406a-b and configured to support 5G mobility features (e.g. beam control). The SnapDragon® X50 is an example of a modem 404. The modem 404 provides signal and control data to a plurality of antenna modules. The antenna modules 406a-b may be multiple-input-multiple output (MIMO) antenna arrays configured to enable beam forming, beam steering and beam tracking. For example, the antenna modules may include an array of patch antennas and the modem 404 may be configured to utilize phase shifters and/or hybrid antenna couplers to control the power directed to the antenna array and to control the resulting beam pattern. While two antenna modules are depicted in FIG. 4, additional modules may be coupled to the modem 404. The first antenna module 406a is an example of beam steering such that a single beam of fixed width is steered across different reference angles. The antenna module 406a is configured to sweep through different angle sensitivity relative to an antenna array. For example, the antenna module 406a may be configured to sequentially receive a signal in a first beam direction 408a, a second beam direction 408b, and a third beam direction 408c. The angular orientation between a beam direction and a reference direction (e.g., orthogonal to the antenna array) may be referred to as a mean angle 412. In an example, the angular orientation may be based on a reference system (e.g., true north, magnetic north, etc.). The mobile device 400 may be configured to measure the RSRP/RSRQ of a transmitted beam that is received by each of the receive beams 408a-c. The mean angle 412 and RSRP/RSRQ values for respective receive beams 408a-c may be used to improve the accuracy of E-CID positioning.

The second antenna module 406b is an example of a single beam with a controllable beam width. The modem 404 is configured to vary the receiver beam width. For example, the number of antenna patches may be changed to vary the receiver beam width. The modem 404 may be configured, for example, to generate a first receive beam 410a, a second receive beam 410b that is wider than the first receive beam 410a, and a third receive beam 410c that is wider than the second receive beam 410b. The uniform beam widths and shapes depicted in FIG. 4 are examples to demonstrate the concept of varying beam widths. The actual beam widths and shapes may vary. The mobile device 400 may be configured to measure the RSRP/RSRQ of a transmitted beam for each of the different beam widths values associated with each of the receive beams 410a-c.

Figure 5:
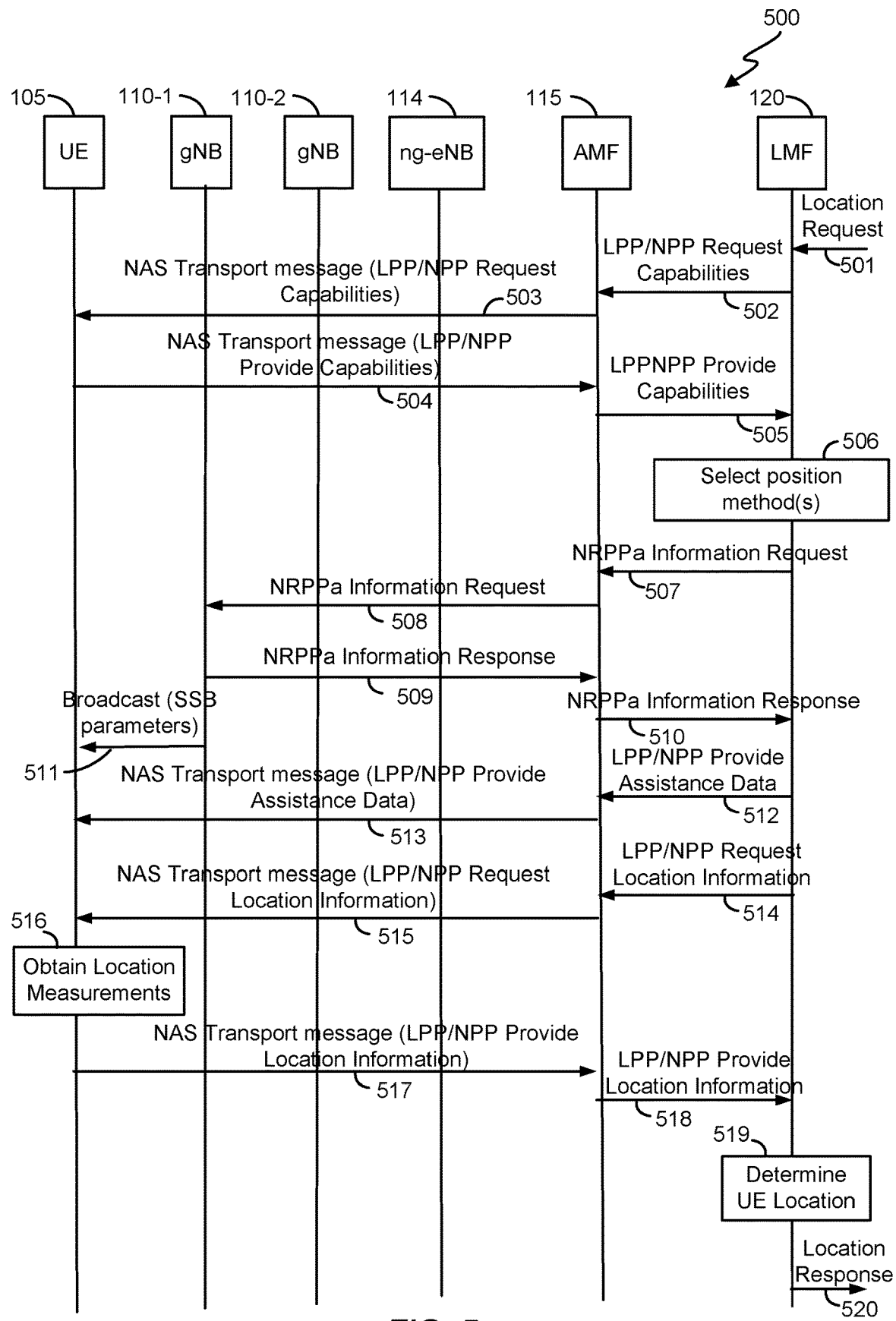
FIG. 5 is a signaling flow diagram showing messages sent between components of a communication network during a location session.

Referring to FIG. 5, with further reference to FIG. 1, shows a signaling flow 500 that illustrates the various messages sent between components of a communication network, such as the communication system 100 depicted in FIG. 1, during a location session using LPP and/or NPP (also referred to as an LPP/NPP session) between the UE 105 and a location server corresponding to the LMF 120. While the signaling flow 500 is discussed, for ease of illustration, in relation to a 5G communication network implementation, similar messaging may be realized for other communication technologies or protocols (such as EPS or WLAN). Furthermore, in some embodiments, the UE 105 itself may be configured to determine its location using, for example, assistance data provided to it (e.g. by LMF 120 or by a serving gNB 110-1). The positioning protocol used for signaling flow 500 may be LPP, NPP or LPP combined with NPP (e.g. where an LPP message includes an embedded NPP message). Messages for the positioning protocol are accordingly referred to below as LPP/NPP messages to indicate that the messages are for LPP, NPP or LPP combined with NPP. However, other positioning protocols are also possible such as the LPP Extensions (LPPe) protocol defined by the Open Mobile Alliance (OMA).

In some embodiments, a location session for UE 105 can be triggered when the LMF 120 receives a location request for UE 105 at action 501. Depending on the scenario, the location request may come to the LMF 120 from the AMF 115 or from the GMLC 125 depicted in FIG. 1. The LMF 120 may then query the AMF 115 for information for the UE 105. The AMF 115 may then send information for the UE 105 to the LMF 120 (not shown in FIG. 5). The information may indicate that UE 105 has 5G (or LTE or eLTE) wireless access (for the example embodiments of FIG. 5), and may provide a current 5G serving cell for UE 105 (e.g. a cell supported by gNB 110-1 which may be a serving gNB for UE 105) and/or may indicate that the UE 105 supports location using LPP and/or NPP. Some or all of this information may have been obtained by the AMF 115 from UE 105 and/or from the gNB 110-1, e.g., when the UE 105 attaches to and registers with the 5GC 140.

To begin the LPP/NPP session (e.g., and based on an indication of UE 105 support for LPP and/or NPP with 5G wireless access), the LMF 120 sends an LPP/NPP Request Capabilities message at action 502 to the AMF 115 serving the UE 105 (e.g. using 5G LCS AP). The AMF 115 may include the LPP/NPP Request Capabilities message within a 5G NAS transport message, at action 503, which is sent to the UE 105 (e.g., via a NAS communication path in the NG-RAN 135, as illustrated in FIG. 1). The UE 105 responds to the AMF 115 with an LPP/NPP Provide Capabilities message at action 504, also within a 5G NAS transport message. The AMF 115 extracts the LPP/NPP Provide Capabilities message from the 5G NAS transport message and relays the LPP/NPP Provide Capabilities message to the LMF 120 (e.g., using 5G LCS AP) at action 505. Here, the LPP/NPP Provide Capabilities message sent at actions 504 and 505 may indicate the positioning capabilities of the UE 105, e.g., the position methods and associated assistance data supported by the UE 105 (such as A-GNSS positioning, OTDOA positioning, E-CID positioning, WLAN positioning, etc.) while accessing a 5G network.

Based on the positioning capabilities of the UE 105 received at action 505 and possibly based on the location request received at action 501 (e.g. a location accuracy requirement included in the location request received at action 501), the LMF 120 may select one or more position methods to locate UE 105 at action 506. For example, the LMF may E-CID at action 506 in association with directional synchronization signal (e.g., SS Blocks) transmitted from gNBs 110 and/or from ng-eNB 114.

Based on the position method(s) selected at action 506 and the assistance data indicated by the UE 105 as being supported at action 505, the LMF 120 may determine assistance data for the UE 105 to support the selected position method(s). LMF 120 may then send an NRPPa Information Request message at action 507, which may be relayed to the serving node gNB 110-1 by the AMF 115 (at action 508). The NRPPa Information Request may request location related information for gNB 110-1, such as the location of gNB 110-1, E-CID configuration parameters for gNB 110-1 and/or information concerning broadcast of assistance data by the gNB 110-1. The NRPPa Information Request sent at actions 507 and 508 may include a request for configuration parameters related to directional SS Blocks. The serving node gNB 110-1 responds with an NRPPa Information Response message, at action 509, which may be relayed to the LMF 120 by the AMF 115 at action 510. The NRPPa Information Response may provide some or all of the location related information requested at actions 507 and 508. For example, when configuration parameters for E-CID positioning information are requested at actions 507 and 508, the NRPPa Information Response may provide signal characteristics, beam angles, and other configuration information for each SS Block supported by gNB 110-1. Actions 507-510 may be repeated by the LMF 120 to obtain location related information (e.g. configuration parameters for SS Blocks) from other gNB 110s and/or ng-eNBs nearby to UE 105, such as gNB 110-2 and ng-eNB 114 (not shown in FIG. 5).

In some implementations, serving gNB 110-1, and/or other gNBs 110 and ng-eNBs such as gNB 110-2 and ng-eNB 114 (not shown in FIG. 5) may broadcast assistance data to UE 105 (and to other UEs) at action 511 and/or may provide assistance data to UE 105 by point to point means, e.g. using a Radio Resource Control Protocol (RRC) for 5G access (not shown in FIG. 5). The broadcast may use System Information Blocks (SIBs) for an RRC protocol in some implementations. The assistance data may include configuration parameters and signal characteristics for SS Blocks (e.g., beam identification values and angular data) that are transmitted by the sending gNB 110 and/or that are transmitted by other nearby gNBs 110 and/or ng-eNB 114. In some embodiments, actions 512 and 513, as described next, may not occur—e.g. if all location related information can be broadcast to UE by gNB 110-1 and/or by other gNBs 110 and/or ng-eNB 114.

The LMF 120 may send some or all of the assistance data received at action 510, and possibly other assistance data already known to the LMF 120, to the UE 105 via an LPP/NPP Provide Assistance Data message sent to the AMF 115 at action 512, and relayed to the UE 105 by the AMF 115 in a 5G NAS transport message at action 513. In the case of E-CID positioning, the assistance data can include the identities of a reference cell and neighbor cells supported by gNBs 110 and/or by ng-eNB 114 and may include information for each cell, such as SS Burst and SS Block information transmitted within the cell. The assistance data may also include configuration parameters and signal characteristics that are associated with different directional signals that can be beamformed by the antenna arrays of gNBs 110 and/or ng-eNB 114.

The NAS Transport message transmitted at the action 513 can be followed by an LPP/NPP Request Location Information message, again sent from the LMF 120 to AMF 115, at action 514, which is relayed to the UE 105 in a 5G NAS transport message by AMF 115 at action 515. The LPP/NPP Request Location Information message may request one or more location measurements from UE 105 and/or a location estimate according to, for example, the position method(s) selected at action 506 and/or the position capabilities of UE 105 sent to LMF 120 at actions 504 and 505. The positioning measurements may, for example, include a request for E-CID measurements quantities such as a received beam ID, a mean angle per received beam, RSRP/RSRQ per received beam ID, receiver beam width per beam ID.

At action 516, the UE 105 can subsequently obtain some or all of the location measurements (and other information) requested at actions 514 and 515. The location measurements may be made based, in part, on the directional SS Blocks transmitted by the serving gNB 110-1 and/or by other nearby gNBs 110 and/or ng-eNB 114. For example, SS Blocks may be transmitted by gNBs 110 and/or ng-eNB 114 within the reference cell and/or neighbor cells. The measurements obtained at action 516 may comprise some or all of the measurements requested at action 515 or implied at action 515 if action 515 requests a location estimate from UE 105. UE 105 may measure a directional SS Blocks (e.g. for a serving cell or neighbor cell) based on configuration parameters and signal characteristics provided for the directional SSB parameters in the location related information received at action 511 and/or at action 513. In an example, the UE 105 determines measurement quantities for each received beam. The measurement quantities may include a beam ID of a received beam as well as the measurement quantities for each receive beam as depicted in FIG. 4. Thus, for each beam ID (e.g., a directional beam transmitted a gNB), the UE 105 may be configured to determine a mean angle of the receive beams (e.g., the angle between the first, second and third beams 408a-c), a receiver beam width per beam ID, and a RSRP/RSRQ per ID.

In some embodiments, at least some of the location measurements obtained at action 516 are provided in an LPP/NPP Provide Location Information message, which is sent from the UE 105 to the AMF 115 in a 5G NAS transport message at action 517. The AMF 115 extracts the LPP/NPP Provide Location Information message from the 5G NAS transport message, and relays it to the LMF 120 (e.g., using 5G LCS AP) at action 518. With this information, the LMF 120 can then determine the UE 105 location at action 519. For example, when the measurements quantities returned by UE 105 at actions 517 and 518 include measurements for one or more directional SS Blocks (e.g. Beam ID/SSB Index, and measurements of mean angle, RSRP, RSRQ, receiver beam width), the LMF 120 may identify a directional angle and range corresponding to the measured quantities. The beam ID may persist in a codebook with the corresponding angular data. The mean angle, RSRP/RSRQ and receiver beam width value may be used to refine the angular resolution and range determination between a gNB and the UE 105. Following location determination at action 519, LMF 120 may send the determined location at action 520 to the entity (e.g. GMLC 125 or AMF 115) which sent the location request at action 501.

In some embodiments, UE 105 may determine a location for UE 105 following action 516 (not shown in FIG. 5). The location may be determined by UE 105 as just described for action 519. The location determination by UE 105 may be based on location related information received by UE 105 at action 511 and/or at actions 512 and 513 including location related information described previously and other information such as the locations of antennas for gNBs 110 and/or ng-eNB 114 and any transmission timing differences for gNBs 110 and/or ng-eNB 114. UE 105 may then return the determined location to LMF 120 at actions 517 and 518 instead of returning location measurements. In this embodiment, action 519 may not occur.

Figure 6:
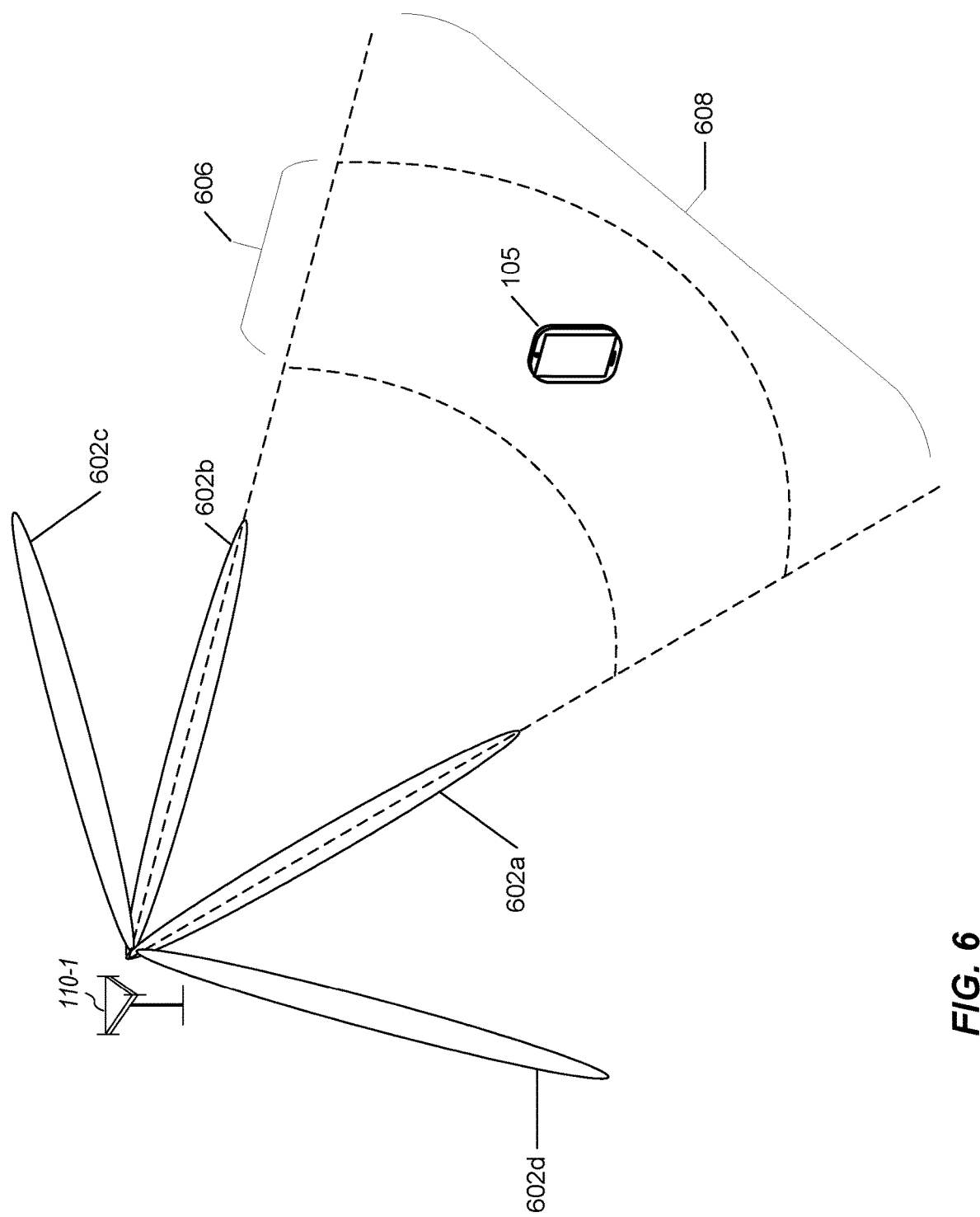
FIG. 6 is a conceptual diagram illustrating E-CID positioning based on multiple beams transmitted from a base station.

Referring to FIG. 6, a conceptual diagram illustrating E-CID positioning based on multiple beams transmitted from a base station is shown. A base station such as a gNB 110-1 is configured to transmit a plurality of synchronization signal blocks (SS blocks) as a plurality of transmitted beams 602a-d. The beam angles depicted in FIG. 6 are examples only. In an example, each beam will cover approximately 30 degrees (e.g., 12 beams to cover 360 degrees). The UE 105 detects a first beam identification value associated with a first beam 602a and a second beam identification value associated with a second beam 602b. An angular area 608 is defined as the area between the first beam 602a and the second beam 602b. The detection of the first and second beam identifications associated with the first beam 602a and the second beam 602b, respectively, may be used to determine that the current position of the UE 105 is within (or proximate to) the angular area 608. In an example, the UE 105 or other network node may include a codebook or other data structure to correlate the geographic coverage of the transmitted beams based on their respective angles and the location of the gNB 110-1. The UE 105 may also be configured to determine the RSRP/RSRQ values associated with the first beam 602a and the second beam 602b. The RSRP/RSRQ values may be used to determine a range between the UE 105 and the gNB 110-1. Other signal information such as Round-Trip Time (RTT) values may also be used to determine a range. For example, a range value 606 may be used in combination with the angular area 608 to determine an estimated position for the UE 105. While FIG. 6 depicts the UE 105 detecting two beams, it is possible for the UE 105 to be completely within an area of a single beam and thus the angular area may be defined by the coverage of a single beam. Further, one or more beams from other base stations may be used to refine the position estimate, and other signaling techniques with multiple base stations (e.g., Time Difference of Arrive (TDOA)) may also be used to determine the estimated position of the UE 105.

Figure 7A:
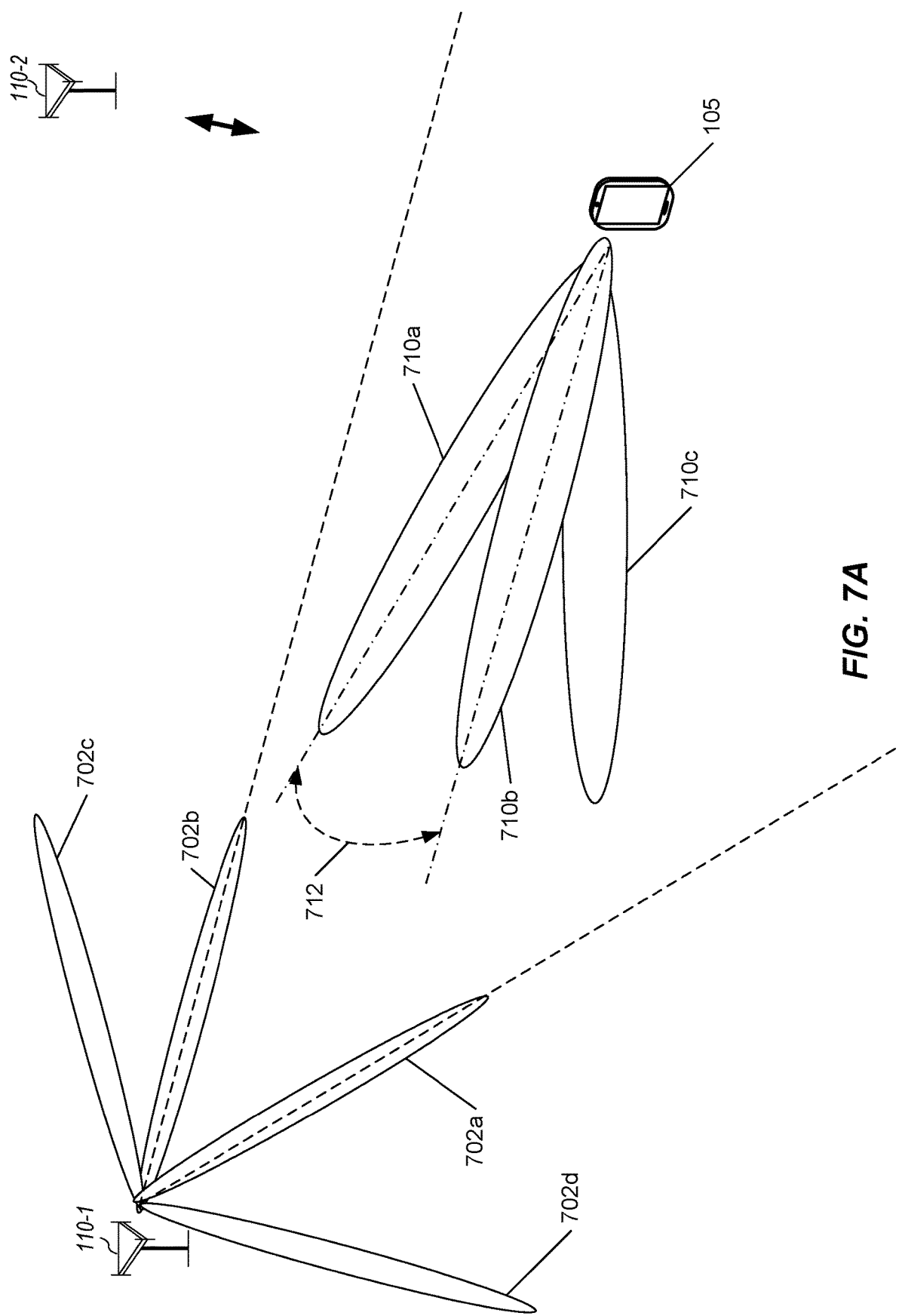
FIG. 7A is a conceptual diagram illustrating E-CID positioning based on beam steering within a mobile device.

Referring to FIG. 7A, with further reference to FIG. 4, a conceptual diagram illustrating E-CID positioning based on beam steering with a mobile device is shown. A base station such as a gNB 110-1 is configured to transmit a plurality of synchronization signal blocks (SS blocks) as a plurality of transmitted beams 702a-d. In operation, other base stations (e.g., a second gNB 110-2) may also transmit a plurality SS block beams (not shown in FIG. 7A), and the positioning solution may use the measured quantities derived from other base stations. The UE 105 is configured to enable a plurality of receive beams 710a-c to receive the beams transmitted by the base stations. In an example, the UE 105 may be configured to use multiple receive beams or steer a single beam across different reference angles to enable multiple beam pattern such as depicted in FIG. 7A. In operation, the UE 105 is configured to determine measurement values for each of the transmitted beams (e.g., 702a-d) that are received by each of the receive beams (e.g., 710a-c). For example, the UE 105 detects a first beam identification value for a first transmitted beam 702a with a first receive beam 710a and a second receive beam 710b. The UE 105 determines first RSRP/RSRQ values for the first transmitted beam 702a based on the first receive beam 710a, and second RSRP/RSRQ values for the first transmitted 702a based on the second receive beam 710b. The UE 105 also determines third RSRP/RSRQ values for the second transmitted beam 702b based on the first receive beam 710a, and fourth RSRP/RSRQ values for the first transmitted 702a based on the second receive beam 710b. The UE 105 may report the RSRP/RSRQ values and the mean angle 712 to a network node (e.g., via NAS transport message 517) to determine the UE location, or the UE 105 may be configured to utilize the measurement values to determine a location.

In an example, the UE 105 may be configured to determine a 3 dB beam width of one or more of the receive beams 710a-c based on the RSRP/RSRQ values. For example, the UE 105 may steer the receive beams 710a-c and determine when the measured values associated with a beam ID (e.g., the second beam 702b) drops by half (e.g., 3 dB). The determined beam width for the receive beam may be included in the reported measurement quantities. An example algorithm for determining the beam width may include determining a first measurement quantity for a first receive beam and a second measurement quantity for a second receive beam. If the second measurement quantity is 50% of the first measurement quantity, then the 3 dB width is based on the angle between the first receive beam and the second receive beam.

Figure 7B:
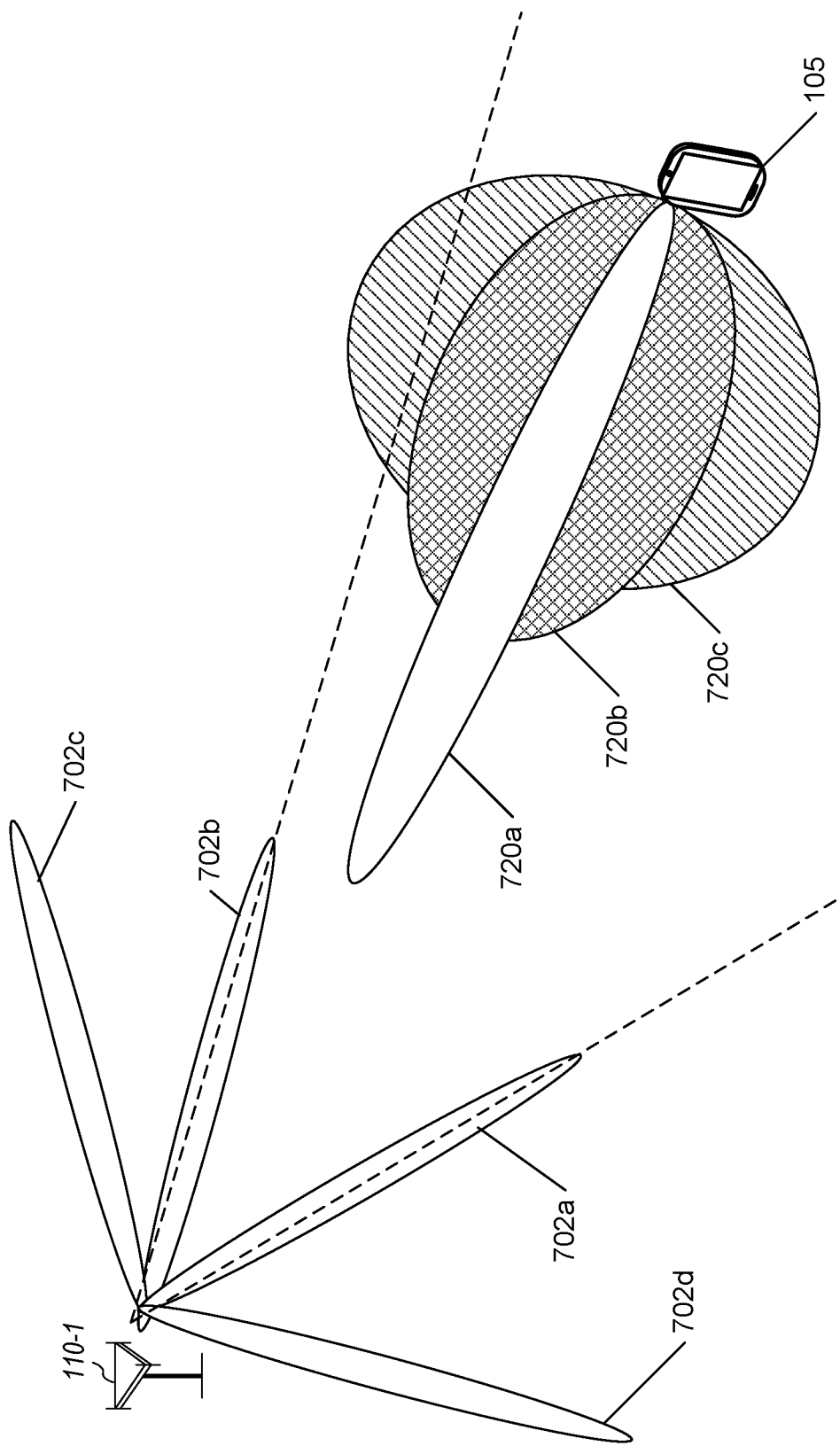
FIG. 7B is a conceptual diagram illustrating E-CID positioning based on a configurable receiver beam width within a mobile device.

Referring to FIG. 7B, with further reference to FIG. 4, a conceptual diagram illustrating E-CID positioning based on a configurable receiver beam width values within a mobile device is shown. As described in FIG. 7A, a base station such as a gNB 110-1 are configured to transmit a plurality of synchronization signal blocks (SS blocks) as a plurality of transmitted beams 702a-d. The UE 105 may receive beams from more than one base station (not shown in FIG. 7B). An antenna module 406b within the UE 105 may be configured to establish a receive beam 720a at a fixed mean angle and at a first beam width. The UE 105 is configured to change the number of antennas and/or antenna gain parameters to increase the receive beam width. For example, the receive beam may be increased to a second beam width 720b or a third beam width 720c. The number and dimensions of the beam widths in FIG. 7B are exemplary only and not a limitation as physical beam geometries may be defined by more abstract shapes. The UE 105 may measure the RSRP/RSRQ for each of the received transmitted beam ID values (e.g., the SSB Index for the transmitted beams 702a, 702b) with each of the different beam widths values associated with the respective beams 720a-c. In an example, the UE 105 may provide each of RSRP/RSRQ values measured by each of the different beam widths for each of the different transmitted beams to a network node such as a location server as measurement quantity. In another example, the UE 105 may be configured use the measured RSRP/RSRQ values for each of the receive beams to estimate a 3 dB beam width of the receive beam. That is, the UE 105 may increase the receive beam width sequentially until the RSRP/RSRQ falls by 3 dB. An example algorithm for determining the beam width may include determining a first measurement quantity for a first receive beam and a second measurement quantity for a second receive beam. If the second measurement quantity is 50% of the first measurement quantity, then the 3 dB beam width is equal to a width of the second receive beam. The UE 105 may report the estimate of a 3 dB receive beam width as a measured quantity to a network node.

Figure 8:
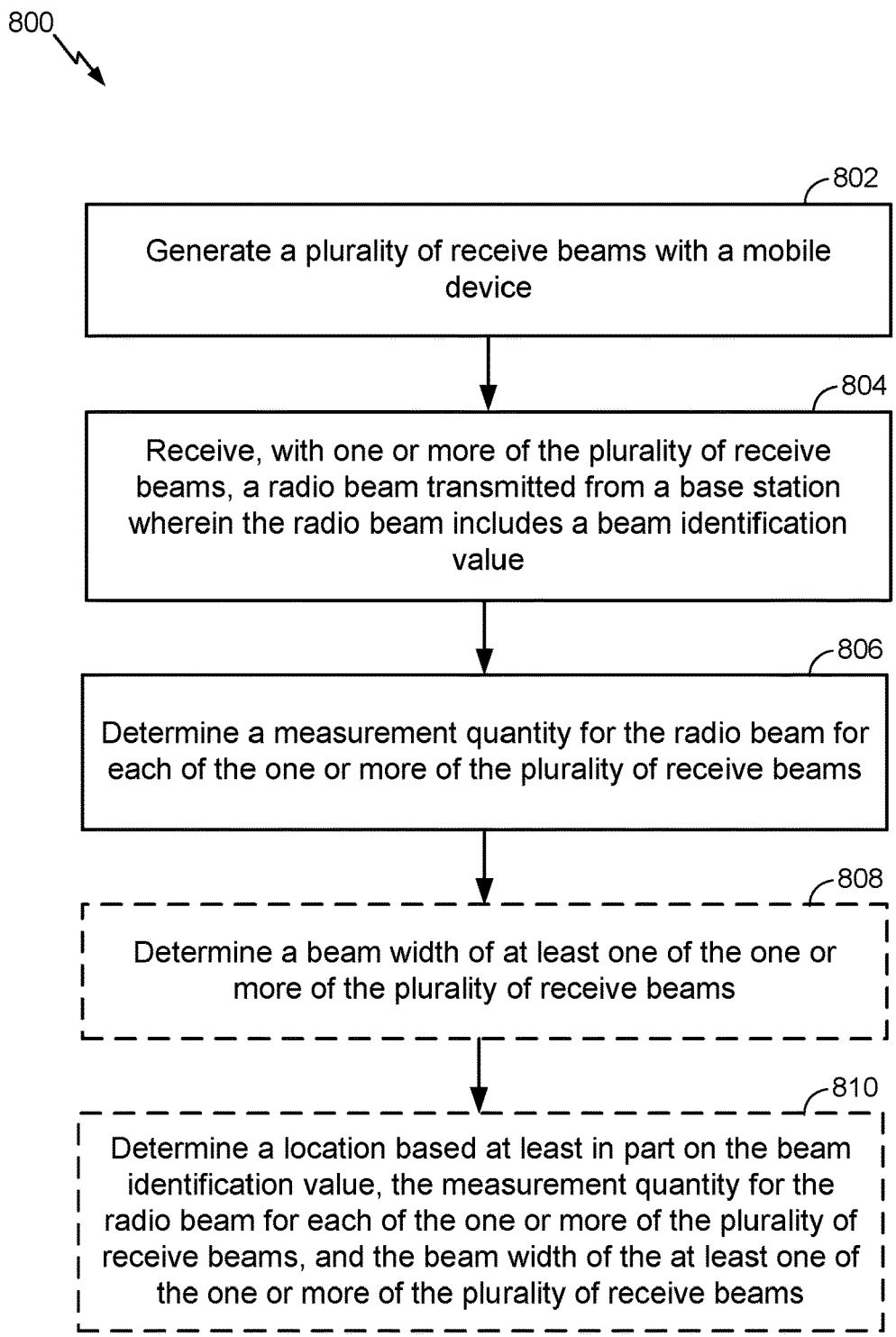
FIG. 8 is a flowchart of an example procedure, generally performed at a mobile device, to support and facilitate positioning of the mobile device.

Referring to FIG. 8, with further reference to FIGS. 1-7B, a method 800 generally performed at a mobile device, to support and facilitate positioning of the mobile device includes the stages shown. The method 800 is, however, an example only and not limiting. The method 800 may be altered, e.g., by having stages added, removed, rearranged, combined, performed concurrently, and/or having single stages split into multiple stages. For example, stage 808 described below of determining a beam width of a receive beam is optional and may not be needed to determine a location at stage 810. Still other alterations to the method 800 as shown and described are possible.

At stage 802, the method 800 includes generating a plurality of receive beams with a mobile device. The modem 404 and antenna module 406a in a UE 105 are an example of a means for generating a plurality of receive beams. Antenna modules within the UE 105 may include an array of antennas (e.g., patches, lines, dipoles, etc.) and the modem 404 may be configured to utilize phase shifters and/or hybrid antenna couplers to control the antenna array and to control the resulting beam pattern. In an example, the UE 105 may generate multiple receive beams at fixed reference angles. The UE 105 may be configured to generate a single receive beam of a fixed width and steer the beam across at different reference angles (e.g., receive beams 710a-c in FIG. 7A). In an example, the UE 105 may generate a single beam with a fixed mean angle and the increase the receive beam width (e.g., receive beams 720a-c in FIG. 7B). The initial receive beam parameters may be based on information received from a network node. The UE 105 may receive a broadcast or a request message from a base station. In an example, the UE 105 may receive a LPP or NPP message with instructions to obtain one or more measurement quantities (e.g. beam ID, receive beam width, mean angle, RSRP, RSRQ measurements) of directional signals transmitted within particular cells supported by particular gNBs 110.

At stage 804, the method 800 includes receiving, with one or more of the plurality of receive beams, a radio beam transmitted from a base station wherein the radio beam includes a beam identification value. The modem 404 and antenna module 406a in a UE 105 are an example of a means for receiving a radio beam transmitted from a base station. In a 5G NR wireless network, a base station such as a gNB may transmit a synchronization signal. During an initial signal acquisition procedure, a UE 105 may receive one or more radio beams with each radio beam including a beam identification value (e.g., SSB Index). The UE 105 may be configured to receive radio beams from other base stations within a communication network. Each received radio beam may be identified with Cell identification information in addition to SSB index values.

At stage 806, the method 800 includes determining a measurement quantity for the radio beam for each of the one or more of the plurality of receive beams. The UE 105 is an example means for determining measurement quantities. The UE 105 is configured to determine a measurement quantity for each of the transmitted radio beams that are received by each of the receive beams. For example, referring to FIG. 7A, the UE 105 detects a beam identification value for a transmitted radio beam 702a with a first receive beam 710a and a second receive beam 710b. The UE 105 determines first reference signal received power/reference signal received quality (RSRP/RSRQ) values for the transmitted beam 702a based on the first receive beam 710a, and second RSRP/RSRQ values for the transmitted beam 702a based on the second receive beam 710b. The UE 105 may also determine a mean angle 712 per receive beam as a measurement quantity. The mean angle 712 may be measured relative to the orientation of the UE 105 for each of the respective receive beams (e.g., 710a-b). In an example mean angle 712 may be expressed relative to an external coordinate system (e.g, true north, magnetic north). In an example, the UE 105 may be configured to establish a receive beam at a fixed mean angle and at a first beam width and then change the number of antennas and/or antenna gain parameters to increase the receive beam width. The UE 105 may determine a RSRP/RSRQ value for each of the different beam widths as measured quantities for the received radio beam.

At stage 808, the method 800 optionally includes determining a beam width of at least one of the one or more of the plurality of receive beams. The UE 105 is an example means for determining a beam width. The UE 105 may be configured to determine a 3 dB beam width of one or more of the receive beams based on the measurement quantities such as the RSRP/RSRQ values determined at stage 806. In an example, the UE 105 may steer the receive beams to determine when the measured values associated with a radio beam drops by 50%. In another example, the UE 105 may establish a receive beam at a fixed mean angle and at a first beam width and then change the number of antennas and/or antenna gain parameters to increase the receive beam width. The UE 105 may then the measured RSRP/RSRQ values of the radio beam for each of the different receive beam widths to estimate a 3 dB beam width of the radio beam. That is, the UE 105 may increase the receive beam width sequentially until the RSRP/RSRQ for the radio beam falls by 50%.

At stage 810, the method 800 optionally includes determining a location based at least in part on the beam identification value, the measurement quantity for the radio beam for each of the one or more of the plurality of receive beams, and the beam width of the at least one of the one or more of the plurality of receive beams. The UE 105 or a network node such as the LMF 120 are example means for determining a location. The measurements quantities determined at stages 806 and 808 may include measurements for one or more radio beams (e.g. Beam ID/SSB Index, and measurements of mean angle, RSRP, RSRQ, and beam width). The UE 105 or the LMF 120 may identify a directional angle and range corresponding to the measured quantities. The beam ID may persist in a codebook with the corresponding angular data for a base station. The mean angle, RSRP/RSRQ and beam width information may be used to refine the angular resolution and range determination between a gNB and the UE 105.

Figure 9:
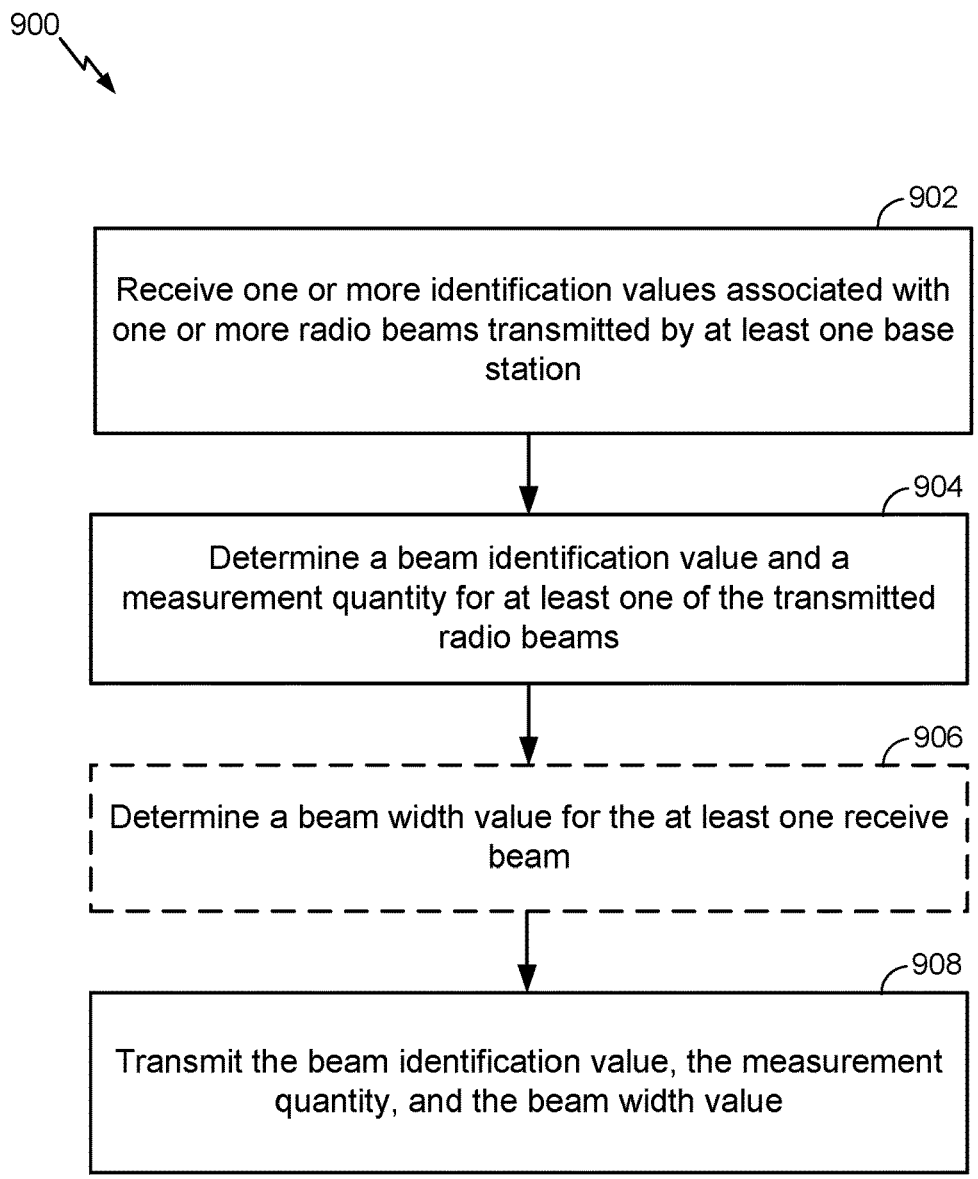
FIG. 9 is a flowchart of an example procedure, generally performed at a mobile device, to provide E-CID measurements to a network node.

Referring to FIG. 9, with further reference to FIGS. 1-7B, a method 900 generally performed at a mobile device, to provide E-CID measurements to a network node includes the stages shown. The method 900 is, however, an example only and not limiting. The method 900 may be altered, e.g., by having stages added, removed, rearranged, combined, performed concurrently, and/or having single stages split into multiple stages. For example, stage 906 described below of determining a beam width of a receive beam can be optional and may not be transmitted at stage 908. Still other alterations to the method 900 as shown and described are possible.

At stage 902, the method 900 includes receiving one or more identification values associated with one or more radio beams transmitted by at least one base station. The modem 404 and antenna module 406a in a UE 105 are an example of a means for receiving a radio beam including an identification value. In a 5G NR wireless network, a base station such as a gNB may transmit a synchronization signal. During an initial signal acquisition procedure, a UE 105 may receive one or more radio beams with each radio beam including a beam identification value (e.g., SSB Index). The UE 105 may be configured to receive radio beams from other base stations within a communication network. Each received radio beam may be identified with cell identification information in addition to SSB index values.

At stage 904, the method 900 includes determining a beam identification value and a measurement quantity for at least one of the transmitted radio beams. The UE 105 is an example means for determining a beam identification value and measurement quantities for the transmitted radio beams. The UE 105 is configured to determine one or more measurement quantities for each of the transmitted radio beams. In an example, referring to FIG. 7A, the UE 105 detects a beam identification value for a transmitted radio beam 702a with a first receive beam 710a and a second receive beam 710b. The UE 105 determines RSRP/RSRQ values for each of a plurality of receive beams. The UE 105 may also determine a mean angle based on the relative angle of a receive beam. The UE 105 may also be configured to vary the beam width and determine a RSRP/RSRQ value for each of the different beam widths as measured quantities for the transmitted radio beam. In an example, the UE 105 may receive an enhanced cell identification measurement initiation request message to the including a measurement quantities information element enumerating a beam ID value, a mean angle per receive beam value, a reference signal received power per beam ID value, and a receive beam width per beam ID value.

At stage 906, the method 900 optionally includes determining a beam width value for the at least one receive beam. The UE 105 is an example means for determining a beam width. The UE 105 may be configured to determine a 3 dB beam width of one or more of receive beams based on the measurement quantities such as the RSRP/RSRQ values determined at stage 904. In an example, the UE 105 may steer a receive beam to determine when the measured values associated with a transmitted radio beam drops by 3 dB. In another example, the UE 105 may establish a receive beam at a fixed mean angle and at a first beam width and then change the number of antennas and/or antenna gain parameters to increase the receive beam width. The UE 105 may then the measured RSRP/RSRQ values of the transmitted radio beam for each of the different receive beam widths to estimate a 3 dB beam width of the radio beam. That is, the UE 105 may increase the receive beam width sequentially until the RSRP/RSRQ for the radio beam falls by 3 dB.

At stage 908, the method 900 includes transmitting the beam identification value, the measurement quantity, and the beam width value. The UE 105 is an example means for transmitting measurement quantities. In an example, the UE 105 may generate and E-CID measurement result message in an LPP/NPP Provide Location Information message, which is sent from the UE 105 to the AMF 115 in a 5G NAS transport message at action. The E-CID measurement result message may include beam results information elements such as the measured beam ID of the reported cell, the mean angle of the receiver beam, the RSRP measured per beam, the RSRQ measured per beam, and a receive beam width value for which the power does not drop by more than 3 dB. The AMF 115 may extract the E-CID measurement results from the 5G NAS transport message and relay the results to the LMF 120 (e.g., using 5G LCS AP). The LMF 120 may be configured to determine the UE 105 location based on the beam identification value and the measurement quantity. In an example, the beam width value may be used in the location calculation.

Figure 10:
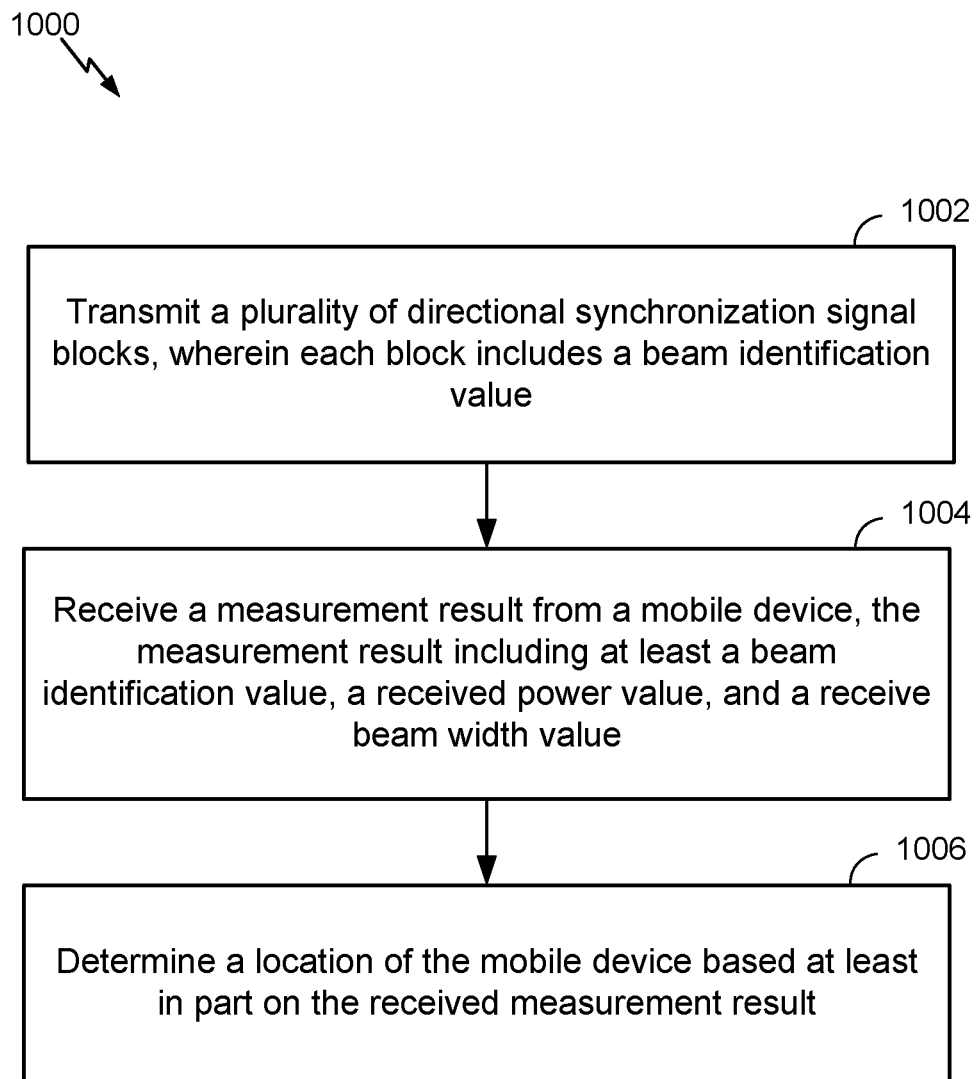
FIG. 10 is a flowchart of an example procedure, generally performed at a network node, to facilitate positioning of a mobile device.

Referring to FIG. 10, with further reference to FIGS. 1-7B, a method 1000 generally performed at one or more network nodes, to facilitate positioning of a mobile device includes the stages shown. The method 1000 is, however, an example only and not limiting. The method 1000 may be altered, e.g., by having stages added, removed, rearranged, combined, performed concurrently, and/or having single stages split into multiple stages. For example, stage 1004 described below for receiving a beam width of a receiver beam can be optional. Still other alterations to the method 1000 as shown and described are possible.

At stage 1002, the method 1000 includes transmitting a plurality of directional synchronization signal blocks, wherein each block includes a beam identification value. A gNB 110 is a means for transmitting a plurality of directional synchronization blocks. In a 5G NR wireless network, a base station such as a gNB may transmit a synchronization signal. During an initial signal acquisition procedure, a UE 105 may receive one or more radio beams with each radio beam including a beam identification value (e.g., SSB Index). The UE 105 may be configured to receive radio beams from other base stations within a communication network. Each received radio beam may be identified with cell identification information in addition to SSB index values.

At stage 1004, the method 1000 includes receiving a measurement result from a mobile device, the measurement result including at least a beam identification value, a received power value, and a receive beam width value. A gNB 110 is a means for receiving measurement results. In an example, the UE 105 may receive an E-CID measurement initiation request from the LMF 120 via a gNB 110. In response, the UE 105 may generate and E-CID measurement result message including beam results information elements such as the measured beam ID of the reported cell, the mean angle of the receiver beam, the RSRP measured per beam, the RSRQ measured per beam, and optionally a receiver beam width value for which the power does not drop by more than 3 dB. In an example, the measurement result may include a mean angle of a receive beam relative to the orientation of the mobile device or other coordinate system, and the location of the mobile device may be based at least in part on the mean angle of the receive beam. The E-CID measurement results may be a LPP/NPP Provide Location Information message, which is sent from the UE 105 to the AMF 115 in a 5G NAS transport message at action. In an example, receiving the E-CID measurements results may include receiving an enhanced cell identification measurement result message from the mobile device. The enhanced cell identification measurement result message may include a result beam information element enumerating a beam ID value, a mean angle of the receive beam value, a reference signal received power per beam value, and a receiver beam width value.

At stage 1006, the method 1000 includes determining a location of the mobile device based at least in part on the received measurement result. The LMF 120 is a means for determining a location of the mobile device. The LMF 120 may identify a directional angle and range corresponding to the E-CID measurement results message. For example, the cell IDs and beam IDs for each of the SS Blocks on each of the base stations may persist in a codebook or similar data structure with the corresponding angular data relative to the base stations. The mean angle, RSRP/RSRQ and receive beam width information may be used to refine the angular resolution and range determination between a gNB and the UE 105. The location of the mobile device may be sent to UE 105 or another network node (e.g., GMLC 125 or AMF 115).

Figure 11:
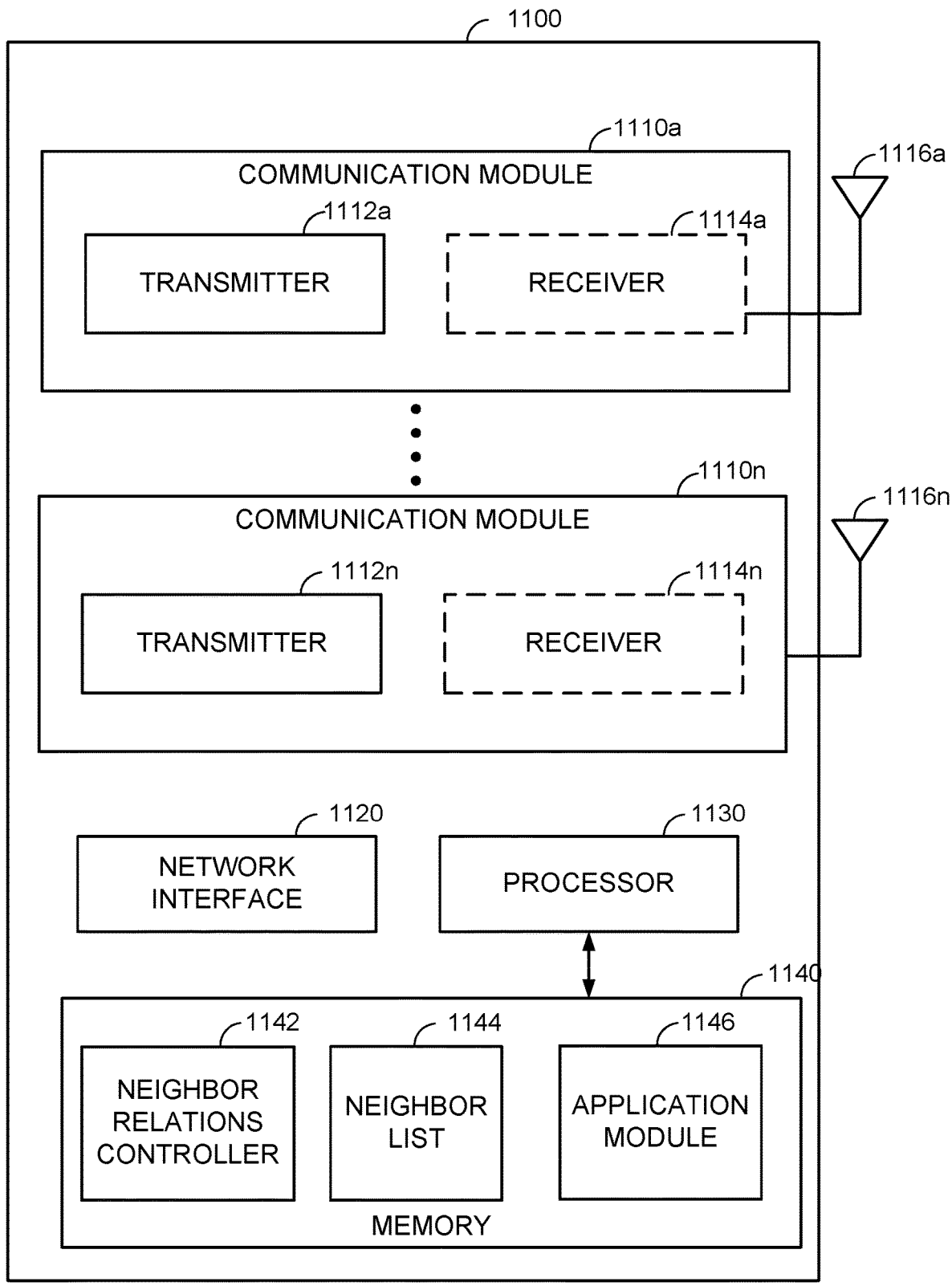
FIG. 11 is a schematic diagram of an example wireless node (such as a base station, access point, or server).

Referring to FIG. 11, a schematic diagram of an example wireless node 1100, such as a base station, access point, or server, which may be similar to, and be configured to have a functionality similar to that, of any of the various nodes depicted, for example, in FIGS. 1, and 5 (e.g., the gNBs 110-1 and 110-2, the ng-eNB 114, LMF 120, components of the 5GC 140), or otherwise discussed herein (e.g. such as an E-SMLC or SLP). The wireless node 1100 may include at least one communication module 1110*a-n*, which may be electrically coupled to one more antenna 1116*a-n* for communicating with wireless devices, such as, for example, the UE 105. Each of the communication modules 1110*a*-1110*n* may include a respective transmitter 1112*a-n* for sending signals (e.g., downlink messages, which may be arranged in frames, and may include directional synchronization signals such as those described herein) and, optionally (e.g., for nodes configured to receive and process uplink communications) a respective receiver 1114*a-n*. In embodiments in which the implemented node includes both a transmitter and a receiver, the communication module comprising the transmitter and receiver may be referred to as a transceiver. The node 1100 may also include a network interface 1120 to communicate with other network nodes via wireline means (e.g., by sending and receiving queries and responses). For example, the node 1100 may be configured to communicate (e.g., via wired or wireless backhaul communication) with a gateway, or other suitable device of a network, to facilitate communication with one or more core network nodes (e.g., any of the other nodes and elements shown in FIGS. 1 and 5). Additionally, and/or alternatively, communication with other network nodes may also be performed using the communication modules 1110*a-n* and/or the respective antennas 1116*a-n*.

The node 1100 may also include other components that may be used with embodiments described herein. For example, the node 1100 may include, in some embodiments, at least one processor (also referred to as a controller) 1130 to manage communications with other nodes (e.g., sending and receiving messages), to generate communication signals and to provide other related functionality, including functionality to implement the various processes and methods described herein. Thus, for example, the processor, in combination with other modules/units of the node 1100, may be configured to cause the node 1100, when functioning as a base station (e.g. a gNB 110 or ng-eNB 114), to generate a plurality of directional synchronization signals (SS Blocks) for at least one cell for the base station, with each of the plurality of directional SS Blocks including a beam identification (e.g., SSB Index). Similarly, for example, the processor, in combination with other modules/units of the node 1100, may be configured to cause the node 1110, when functioning as a location-capable device, to obtain E-CID measurement results from a mobile device, and to determine a location of the mobile device based, at least in part, on E-CID measurement results and a persistent codebook or other data structure.

The processor 1130 may be coupled to (or otherwise communicate with) a memory 1140, which may include one or more modules (implemented in hardware of software) to facilitate controlling the operation of the node 1100. For example, the memory 1140 may include an application module 1146 with computer code for various applications required to perform the operation of the node 1100. For example, the processor 1130 may be configured (e.g., using code provided via the application module 1146, or some other module in the memory 1140) to control the operation of the antennas 1116*a-n* so as to adjustably control the antennas' transmission power and phase, gain pattern, antenna direction (e.g., the direction at which a resultant radiation beam from the antennas 1116*a-n* propagates), antenna diversity, and other adjustable antenna parameters for the antennas 1116*a-n* of the node 1100. Control of the antennas 1116*a-n* of the node 1100, which together constitute an antenna array for the node 1100, may allow, for example, directional synchronization signals to be beam-formed and transmitted in particular directions characterized, in part, by a direction angle and beamwidth. In some embodiments, the antennas' configuration may be controlled according to pre-stored configuration data such as a codebook provided at the time of manufacture or deployment of the node 1100, or according to data obtained from a remote device (such as a central server sending data representative of the antenna configuration, and other operational parameters, that are to be used for the node 1100). The wireless node 1100 may also be configured, in some implementations, to perform location data services, or perform other types of services, for multiple wireless devices (clients) communicating with the wireless node 1100 (or communicating with a server coupled to the wireless node 1100), and to provide location data and/or assistance data to such multiple wireless devices.

In addition, in some embodiments, the memory 1140 may also include neighbor relations controllers (e.g., neighbor discovery modules) 1142 to manage neighbor relations (e.g., maintaining a neighbor list 1144) and to provide other related functionality. In some embodiments, the node 1110 may also include one or more sensors (not shown) and other devices (e.g., cameras).

Figure 12:
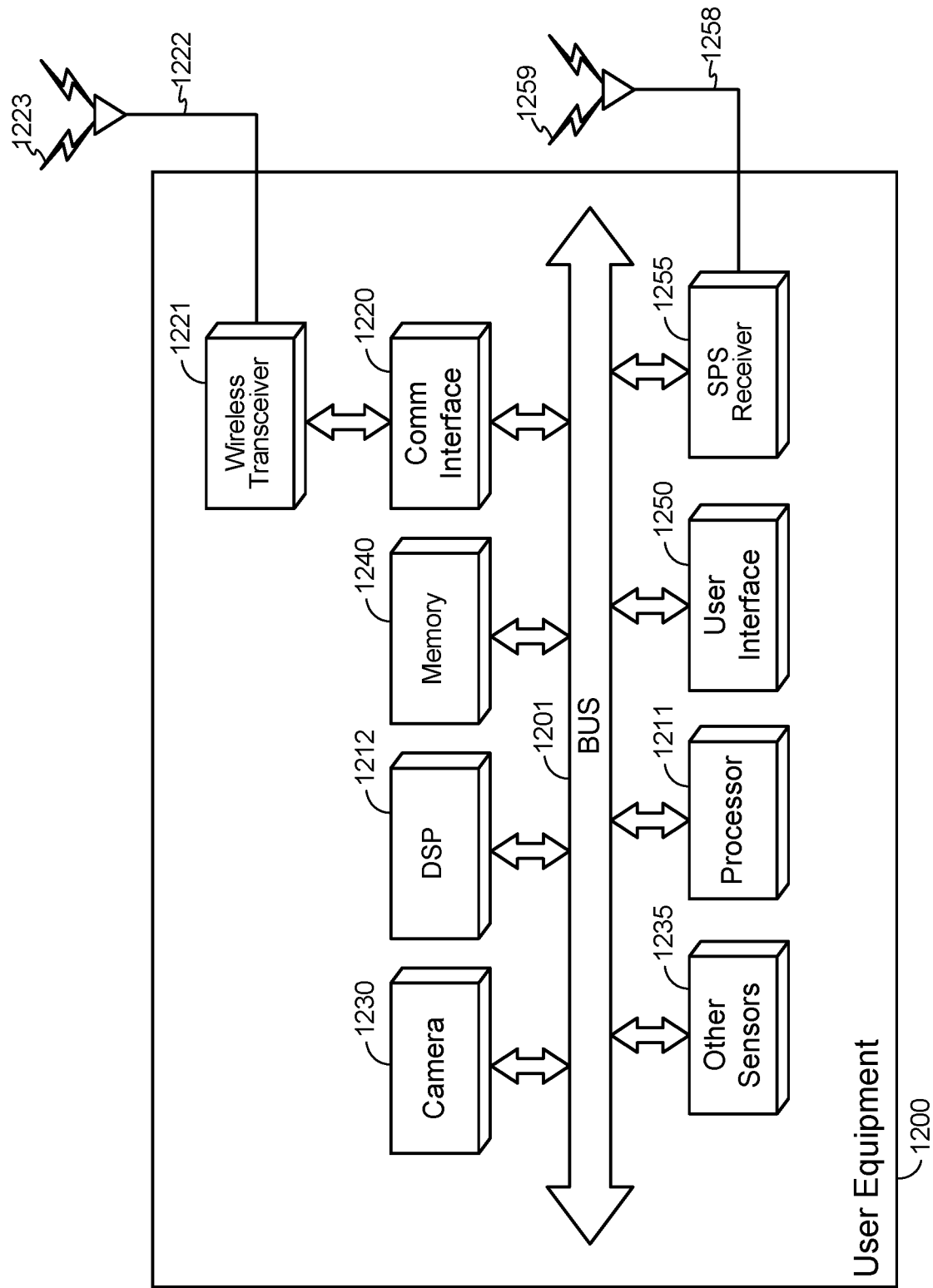
FIG. 12 is a schematic diagram of a mobile device (e.g., a UE).

Referring to FIG. 12, a user equipment (UE) 1200 for which various procedures and techniques described herein can be utilized is shown. The UE 1200 may, in implementation and/or functionality, be similar to or the same as any of the other UEs described herein, including the UE 105 depicted in FIGS. 1, 3-7B. Furthermore, the implementation illustrated in FIG. 12 may also be used to implement, at least in part, some of the nodes and devices illustrated throughout the present disclosure, including such nodes and devices as base stations (e.g. gNBs 110, ng-eNB 114, eNBs, etc.), location servers (e.g. LMF 120), and other components and devices illustrated in and described for FIGS. 1-7B.

The UE 1200 includes a processor 1211 (or processor core) and memory 1240. As described herein, the UE 1200 is configured to detect and process directional synchronization signals (SS Blocks). The UE 1200 may optionally include a trusted environment operably connected to the memory 1240 by a public bus 1201 or a private bus (not shown). The UE 1200 may also include a communication interface 1220 and a wireless transceiver 1221 configured to send and receive wireless signals 1223 via a wireless antenna 1222 over a wireless network (such as the NG-RAN 135 and 5GC 140 of FIG. 1). The wireless transceiver 1221 may include the modem 404 and antenna modules 406*a-b* depicted in FIG. 4. The wireless transceiver 1221 is connected to the bus 1201 via the communication interface 1220. Here, the UE 1200 is illustrated as having a single wireless transceiver 1221. However, the UE 1200 can alternatively have multiple wireless transceivers 1221 and/or multiple wireless antennas 1222 to support multiple communication standards such as WiFi, CDMA, Wideband CDMA (WCDMA), Long Term Evolution (LTE), 5G, NR, Bluetooth® short-range wireless communication technology, etc.

The communication interface 1220 and/or wireless transceiver 1221 may support operations on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, control information, overhead information, data, etc.

The UE 1200 may also include a user interface 1250 (e.g., display, keyboard, touchscreen, graphical user interface (GUI)), and a Satellite Positioning System (SPS) receiver 1255 that receives SPS signals 1259 (e.g., from SPS satellites) via an SPS antenna 1258 (which may be the same antenna as wireless antenna 1222 or may be different). The SPS receiver 1255 can communicate with a single global navigation satellite system (GNSS) or multiple such systems. A GNSS can include, but is not limited to, Global Positioning System (GPS), Galileo, Glonass, Beidou (Compass), etc. SPS satellites are also referred to as satellites, space vehicles (SVs), etc. The SPS receiver 1255 measures the SPS signals 1259 and may use the measurements of the SPS signals 1259 to determine the location of the UE 1200. The processor 1211, memory 1240, Digital Signal Processor (DSP) 1212 and/or specialized processor(s) (not shown) may also be utilized to process the SPS signals 1259, in whole or in part, and/or to compute (approximately or more precisely) the location of the UE 1200, in conjunction with SPS receiver 1255. Alternatively, the UE 1200 may support transfer of the SPS measurements to a location server (e.g., E-SMLC, an LMF, such as the LMF 120 of FIG. 1, etc.) that computes the UE location instead. Storage of information from the SPS signals 1259 or other location signals is performed using a memory 1240 or registers (not shown). While only one processor 1211, one DSP 1212 and one memory 1240 are shown in FIG. 12, more than one of any, a pair, or all of these components could be used by the UE 1200. The processor 1211 and DSP 1212 associated with the UE 1200 are connected to the bus 1201.

The memory 1240 can include a non-transitory computer-readable storage medium (or media) that stores functions as one or more instructions or code. Media that can make up the memory 1240 include, but are not limited to, RAM, ROM, FLASH, disc drives, etc. In general, the functions stored by the memory 1240 are executed by general-purpose processor(s), such as the processor 1211, specialized processors, such as the DSP 1212, etc. Thus, the memory 1240 is a processor-readable memory and/or a computer-readable memory that stores software (programming code, instructions, etc.) configured to cause the processor(s) 1211 and/or DSP(s) 1212 to perform the functions described. Alternatively, one or more functions of the UE 1200 may be performed in whole or in part in hardware.

A UE 1200 can estimate its current position within an associated system using various techniques, based on other communication entities within view and/or information available to the UE 1200. For instance, the UE 1200 can estimate its position using information obtained from base stations (e.g. gNBs, ng-eNBs), access points (APs) associated with one or more wireless local area networks (WLANs), personal area networks (PANs) utilizing a short-range wireless communication technology such as Bluetooth® wireless technology or ZIGBEE®, etc., Global Navigation Satellite System (GNSS) or other Satellite Positioning System (SPS) satellites, and/or map data obtained from a map server or other server (e.g., an LMF, an E-SMLC or SLP). In an embodiment, a location server, which may be an E-SMLC, SLP, Standalone Serving Mobile Location Center (SAS), or an LMF, etc., may provide assistance data to the UE 1200 to allow or assist the UE 1200 to acquire signals (e.g. signals from WLAN APs, signals from cellular base stations (including directional SS signals), GNSS satellites, etc.), provide the UE 1200 with transmitter and/or transceiver (e.g., base stations, access points, beacons, and computing devices) locations (and, in an embodiment, orientations) and associated beam information (beam IDs, orientation (absolute or relative to the orientation of the transmitter), strength, timing, etc.), and enable the UE 1200 to determine range and/or pseudorange and/or relative location and/or orientation based upon location related measurements such as timing related measurements (e.g., TOA, OTDOA, RTT, FTM, etc.) and/or signal strength-related measurements (e.g., RSSI) and/or other beam-related information using these signals, and to calculate location using the locations of the transmitter/transceiver and, in an embodiment, orientation of the transmitter and/or transceiver, and the signal measurements of the signals from the transmitters and/or transceivers. For example, information on the receive beam or beams and transmit beams may be utilized to determine the orientation of the device relative to a given transmitter (e.g., based on which receive beam(s) are used and the orientation of the transmitted beam relative to the transmitter), the distance from the transmitter (e.g., utilizing signal strength or timing information), such that location and orientation of the UE 1200 may be determined with one or more beams from one or more transmitters. The locations and other parameters (e.g., timing information, signal strength, base station ID and/or AP MAC address, base station orientation (compass orientation or relative orientation to the surrounding geography or map features)) for the base stations and access points associated with a WLAN may persist in a codebook or similar base station almanac, which may be stored on UE 1200 and/or as part of a larger base station database which may be remotely stored on a location server. In an embodiment, the beam identification values (e.g., SSB ID) and the associated angular and position information associated with the beams and signal information (e.g., RSS) and, in an embodiment, transmitter information such as discussed above, may be provided by a location server and/or it may be provided by the transmitting device within the signal transmission, for example as a pilot message or as a message embedded within the beam. In an embodiment, base station almanac may include the beam identification values (e.g., SSB ID) and the associated angular and position information associated with the beams and signal information (e.g., RSS), and may update that information based on transmitted information from the respective base station and/or access point or other transmitter or based on information from a location server. In an embodiment, the beam identification values (e.g., SSB ID) and the associated angular and position information associated with the beams and signal information (e.g., RSS) may be transient and, for example, may be received from each respective transmitter/transceiver or from the location server, and utilized to determine location determination on the device without updating the base station almanac information. In an embodiment, the base station almanac may include beam information associated with neighboring base stations and access points. In an embodiment, transmitter information and/or associated beam information may be retained in a base station almanac or other memory storage, so that the base station almanac also contains transmitter and/or beam information for transmitters/transceivers that are no longer within view, such that this information may be utilized for positioning at a later time (e.g., transmitter location and transmitter orientation and other non-transient features may be suitable for use in future position determination actions). In an embodiment, beam and/or transmitter information may be obtained from both the base station almanac and the transceiver/transmitter and/or the location server, such that non-transient aspects of the beams associated with any given transmitter/transceiver, if any, are stored in the base station almanac while transient aspects such as the angle and/or transmitted signal strength associated with a particular beam ID at any given time, are provided to the UE 1200 by the transmitter/transceiver or by the location server. The UE 1200 may provide measurement information regarding one or more base stations and/or APs to the location server to compute a location estimate (which may be known as "UE assisted" positioning) or may compute a location estimate itself (which may be known as "UE based" positioning) based on the measurements and the base station almanac/codebook data provided by the location server (e.g. such as orbital and timing data for GNSS satellites, configuration parameters for the directional PRS signals, the precise location coordinates of WLAN APs and/or cellular base stations for use in OTDOA, AOD and/or E-CID positioning, SSB ID with angular data, SSB ID/RSS position estimates, etc.).

In an embodiment, the location server may obtain additional beam information such as angle and signal strength or time of transmission of a signal, relative to the time of measurement from UE 1200 and/or from the respective transmitter/transceiver that transmitted the respective beam being measured. In an embodiment, the transceiver/transmitter beam configuration may be variable in number, IDs and angle based on the communication requirements of client devices; in an embodiment, the transceiver/transmitter ID, beam ID and beam configuration, particularly if beam configuration is transient, may be communicated to the mobile device, for example, as part of messaging in each beam or in a pilot. In an embodiment, beam configurations may be standardized such that specific beam IDs for any given transmitter correspond to specific beam configurations such as to particular transmit orientations relative to the transmitter/transceiver of a specific beam. In an embodiment, the beam ID may comprise an identifier number or code. In an embodiment, the beam ID may comprise configuration information such as the orientation angle of the beam relative to the corresponding transmitter/transceiver.

In an embodiment, the UE 1200 may determine its location and orientation based upon means described above, in an embodiment, including sensor measurements such as accelerometer, magnetometer, camera and/or gyro measurements to determine or enhance orientation measurements. In an embodiment, the UE 1200 may utilize determined location and orientation in conjunction with beam information (such as transceiver/transmitter ID, beam ID, beam transmit angle/orientation relative to the transceiver/transmitter) and measurements (such as distance related measurements, receive beam information and angle of receipt related measurements) from transceivers/transmitters to determine or to enhance the accuracy of the location and/or orientation associated with a transceiver/transmitter. In an embodiment, the UE 1200 may store this information, for example, for use in location determination or for enhancing the base station almanac on the UE 1200 or for enhancing a base station/transceiver/transmitter database on a location server. In an embodiment, the UE 1200 may forward stored measurements and associated transceiver information to a crowd source server and/or a location server to be utilized to update, improve the accuracy of and/or add to the information stored in a base station database on the crowd source server and/or location server. In an embodiment, the UE 1200 may send stored measurements when requesting base station almanac information or other assistance. In an embodiment, the UE 1200 may send stored measurements when connected to a WiFi system or, for example, periodically (e.g. nightly or weekly) or, for example, when connecting to a charger, or for example, when connected to a system without per unit data charges, or other specific conditions. In an embodiment, the upload conditions may be configurable, for example, utilizing menu input or other configuration input received at the UE 1200.

In one embodiment, the UE 1200 may include a camera 1230 (e.g., front and/or back facing) such as, for example, complementary metal-oxide-semiconductor (CMOS) image sensors with appropriate lens configurations. Other imaging technologies such as charge-coupled devices (CCD) and back side illuminated CMOS may be used. The camera 1230 may be configured to obtain and provide image information to assist in positioning of the UE 1200. In an example, one or more external image processing servers (e.g. remote servers) may be used to perform image recognition and provide location estimation processes. The UE 1200 may include other sensors 1235 which may also be used to compute, or used to assist in computing, a location for the UE 1200. The other sensors 1235 may include inertial sensors (e.g. accelerometers, gyroscopes, magnetometers, a compass, any of which may be implemented based on micro-electro-mechanical-system (MEMS), or based on some other technology), as well as a barometer, thermometer, hygrometer and other sensors. In an example, the compass may be used to determine the mean angles of receive beams.

As noted, in some embodiments the UE 1200 may be configured to generate a plurality of receive beams with a mobile device, receive, with one or more of the plurality of receive beams, a radio beam transmitted from a base station wherein the radio beam includes a beam identification value, determine a measurement quantity for the radio beam for each of the one or more received beams, determine a beam width for each of the one or more receive beams, and determine a location based at least in part on the beam identification value, the measurement quantity for the radio beam for each of the one or more of the plurality of receive beams, and the beam width of the radio beam.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device" or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location Enabled Terminal (SET), a target device, a target, or by some other name.

While some of the techniques, processes, and/or implementations presented herein may comply with all or part of one or more standards, such techniques, processes, and/or implementations may not, in some embodiments, comply with part or all of such one or more standards.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for determining a location of a mobile device, comprising:
   generating a plurality of receive beams with the mobile device;
   receiving, with one or more of the plurality of receive beams, a radio beam transmitted from a base station, wherein the radio beam includes a beam identification value;
   determining a measurement quantity for the radio beam for each of the one or more of the plurality of receive beams; and
   determining a mean angle of at least one of the one or more of the plurality of receive beams relative to an orientation of the mobile device or relative to a coordinate system.

2. The method of claim 1 further comprising:
   determining the location based at least in part on the beam identification value and the measurement quantity for the radio beam for each of the one or more of the plurality of receive beams.

3. The method of claim 2 wherein determining the location includes providing the beam identification value and the measurement quantity for the radio beam for each of the one or more of the plurality of receive beams to a location server and receiving the location from the location server.

4. The method of claim 2 further comprising:
   determining a beam width for at least one of the one or more of the plurality of receive beams; and
   determining the location based at least in part on the beam width.

5. The method of claim 4 further wherein determining the beam width includes determining a first measurement quantity for a first receive beam and a second measurement quantity for a second receive beam, wherein the second measurement quantity is 50% of the first measurement quantity and the beam width is equal to a width of the second receive beam.

6. The method of claim 4 further wherein determining the beam width includes determining a first measurement quantity for a first receive beam and a second measurement quantity for a second receive beam, wherein the second measurement quantity is 50% of the first measurement quantity and the beam width is based on an angle between the first receive beam and the second receive beam.

7. The method of claim 1 wherein the measurement quantity is a reference signal received power value or a reference signal received quality value.

8. A mobile device, comprising:
   one or more modems and antenna modules configured to:
      generate a plurality of receive beams with the mobile device;
      receive, with one or more of the plurality of receive beams, a radio beam transmitted from a base station, wherein the radio beam includes a beam identification value; and
   at least one processor configured to:
      determine a measurement quantity for the radio beam for each of the one or more of the plurality of receive beams; and
      determine a mean angle of at least one of the one or more of the plurality of receive beam relative to an orientation of the mobile device or relative to a coordinate system.

9. The mobile device of claim 8 wherein the at least one processor is further configured to determine a location based at least in part on the beam identification value and the measurement quantity for the radio beam for each of the one or more of the plurality of receive beams.

10. The mobile device of claim 9 wherein the at least one processor is further configured to determine the location by providing the beam identification value and the measurement quantity for the radio beam for each of the one or more of the plurality of receive beams to a location server and to receive the location from the location server.

11. The mobile device of claim 9 wherein the at least one processor is further configured to:
    determine a beam width of at least one of the one or more of the plurality of receive beams; and
    determine the location based at least in part on the beam width.

12. The mobile device of claim 11 wherein the at least one processor is further configured to determine the beam width by determining a first measurement quantity for a first receive beam and a second measurement quantity for a second receive beam, wherein the second measurement quantity is 50% of the first measurement quantity and the beam width is equal to a width of the second receive beam.

13. The mobile device of claim 11 wherein the at least one processor is further configured to determine the beam width by determining a first measurement quantity for a first receive beam and a second measurement quantity for a second receive beam, wherein the second measurement quantity is 50% of the first measurement quantity and the beam width is based on an angle between the first receive beam and the second receive beam.

14. The mobile device of claim 8 wherein the measurement quantity is a reference signal received power value or a reference signal received quality value.

* * * * *